(12) United States Patent
Dingman

(10) Patent No.: US 7,862,124 B2
(45) Date of Patent: Jan. 4, 2011

(54) WEB ADJUSTER AND COUPLING

(75) Inventor: Guy R. Dingman, Lafayette, IN (US)

(73) Assignee: Indiana Mills and Manufacturing, Inc., Westfield, IN (US)

( * ) Notice: Subject to any disclaimer, the term of this patent is extended or adjusted under 35 U.S.C. 154(b) by 1396 days.

(21) Appl. No.: 10/427,362

(22) Filed: Apr. 30, 2003

(65) Prior Publication Data

US 2003/0197415 A1 Oct. 23, 2003

Related U.S. Application Data

(63) Continuation-in-part of application No. 10/206,660, filed on Jul. 26, 2002, now Pat. No. 6,820,310, which is a continuation-in-part of application No. 09/472,258, filed on Dec. 27, 1999, now Pat. No. 6,425,632, which is a continuation-in-part of application No. 09/135,908, filed on Aug. 18, 1998, now Pat. No. 6,017,089.

(60) Provisional application No. 60/307,899, filed on Jul. 26, 2001, provisional application No. 60/394,099, filed on Jul. 5, 2002.

(51) Int. Cl.
B60R 22/00 (2006.01)
(52) U.S. Cl. .......................... 297/476; 297/253; 24/171
(58) Field of Classification Search ............... 24/171, 24/629, 168; 297/253, 474, 476
See application file for complete search history.

(56) References Cited

U.S. PATENT DOCUMENTS

| 510,358 | A | * | 12/1893 | Mullane | ...................... 24/171 |
| 676,910 | A | * | 6/1901 | Pool | ........................ 24/171 X |
| 699,502 | A | * | 5/1902 | Durland | ...................... 24/171 |
| 2,549,841 | A | | 4/1951 | Morrow et al. | |
| 2,856,663 | A | | 10/1958 | Elsner | |
| 2,938,254 | A | | 5/1960 | Gaylord | |
| 3,128,520 | A | | 4/1964 | Carter et al. | |
| 3,414,947 | A | | 12/1968 | Holmberg et al. | |
| 3,540,091 | A | | 11/1970 | Marosy | |

(Continued)

FOREIGN PATENT DOCUMENTS

EP 0 619 201 A1 10/1994

(Continued)

OTHER PUBLICATIONS

"SafeGuard Child Protection Seat Attachment Systems" brochure, IMMI, 2001, 5 pages.

(Continued)

Primary Examiner—Anthony D Barfield
(74) Attorney, Agent, or Firm—Woodard Emhardt Moriarty; McNetta & Henry LLP

(57) ABSTRACT

A web adjuster device for securing and varying a length of a web. The web adjuster device comprising a connector portion and an adjuster portion. The adjuster portion comprising a gripping bar having a pair of ears mounted near each of its ends, a housing including a web stop, and one or more springs to normally urge the bar toward the web stop and against the web. The connector portion comprises a hook portion integrally attached to the web adjuster portion, the hook portion rising generally upwardly and away from the bottom surface of the web adjuster portion.

16 Claims, 34 Drawing Sheets

U.S. PATENT DOCUMENTS

| | | |
|---|---|---|
| 3,591,900 A | 7/1971 | Brown |
| 4,091,508 A * | 5/1978 | Yamada et al. ............. 24/171 X |
| 4,116,402 A * | 9/1978 | Nomura et al. ............. 297/476 |
| 4,136,422 A | 1/1979 | Ivanov et al. |
| 4,184,234 A | 1/1980 | Anthony et al. |
| 4,336,636 A * | 6/1982 | Ishiguro et al. ........... 24/171 X |
| 4,525,901 A | 7/1985 | Krauss |
| 4,832,410 A | 5/1989 | Bougher |
| 4,876,770 A | 10/1989 | Bougher |
| 4,919,484 A | 4/1990 | Bougher et al. |
| 5,377,386 A | 1/1995 | Griffith |
| 5,411,292 A | 5/1995 | Collins et al. |
| 5,471,714 A | 12/1995 | Olson |
| 5,487,588 A | 1/1996 | Burleigh et al. |
| 5,669,663 A | 9/1997 | Feuerherdt |
| 5,695,243 A | 12/1997 | Anthony et al. |
| 5,774,947 A | 7/1998 | Anscher |
| 5,890,762 A | 4/1999 | Yoshida |
| 5,915,630 A | 6/1999 | Step |
| 5,979,982 A | 11/1999 | Nakagawa |
| 6,209,957 B1 | 4/2001 | Baloga et al. |

FOREIGN PATENT DOCUMENTS

| | | |
|---|---|---|
| EP | 0 619 202 A1 | 10/1994 |
| EP | 1 231 100 A1 | 8/2002 |

OTHER PUBLICATIONS

"SafeGuard Child Seat Attachment Systems", IMMI, 1999, 2 pages.
SafeGuard Buckle UP With Confidence:, IMMI, 2002, 13 pages.

* cited by examiner

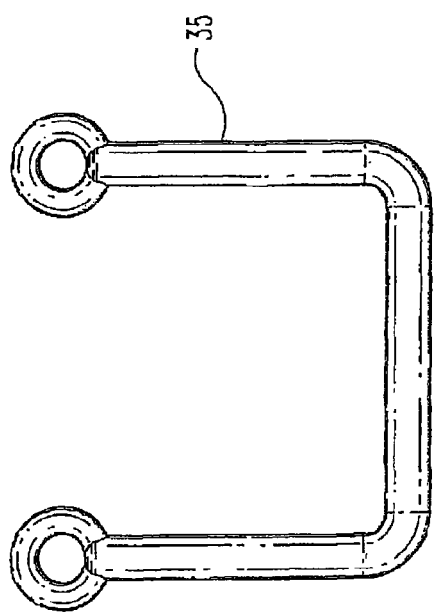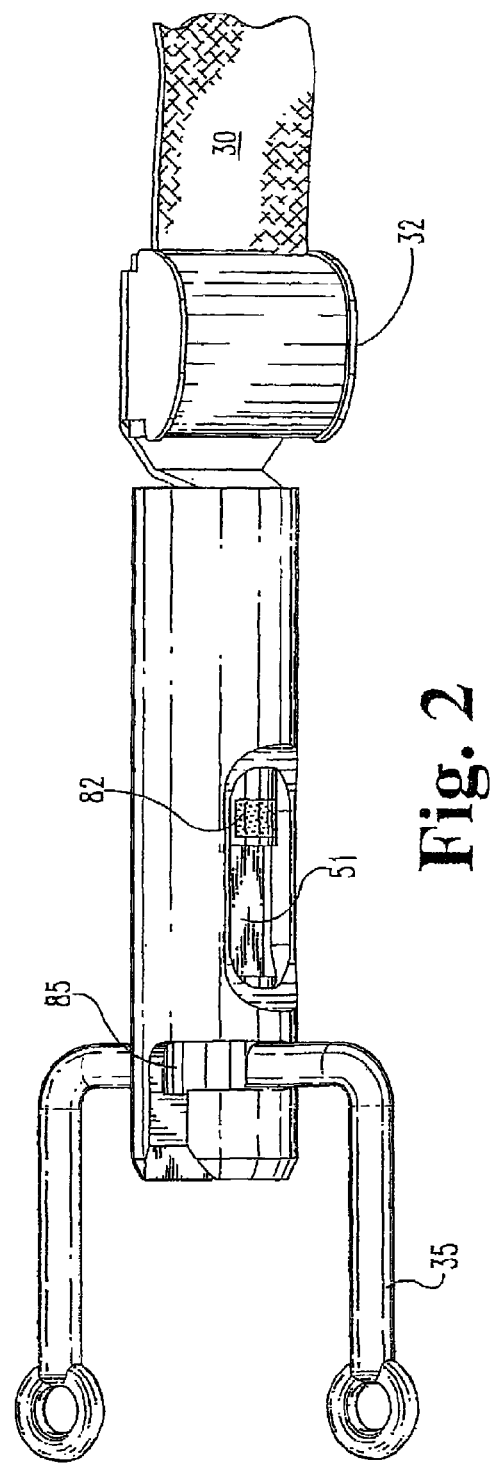

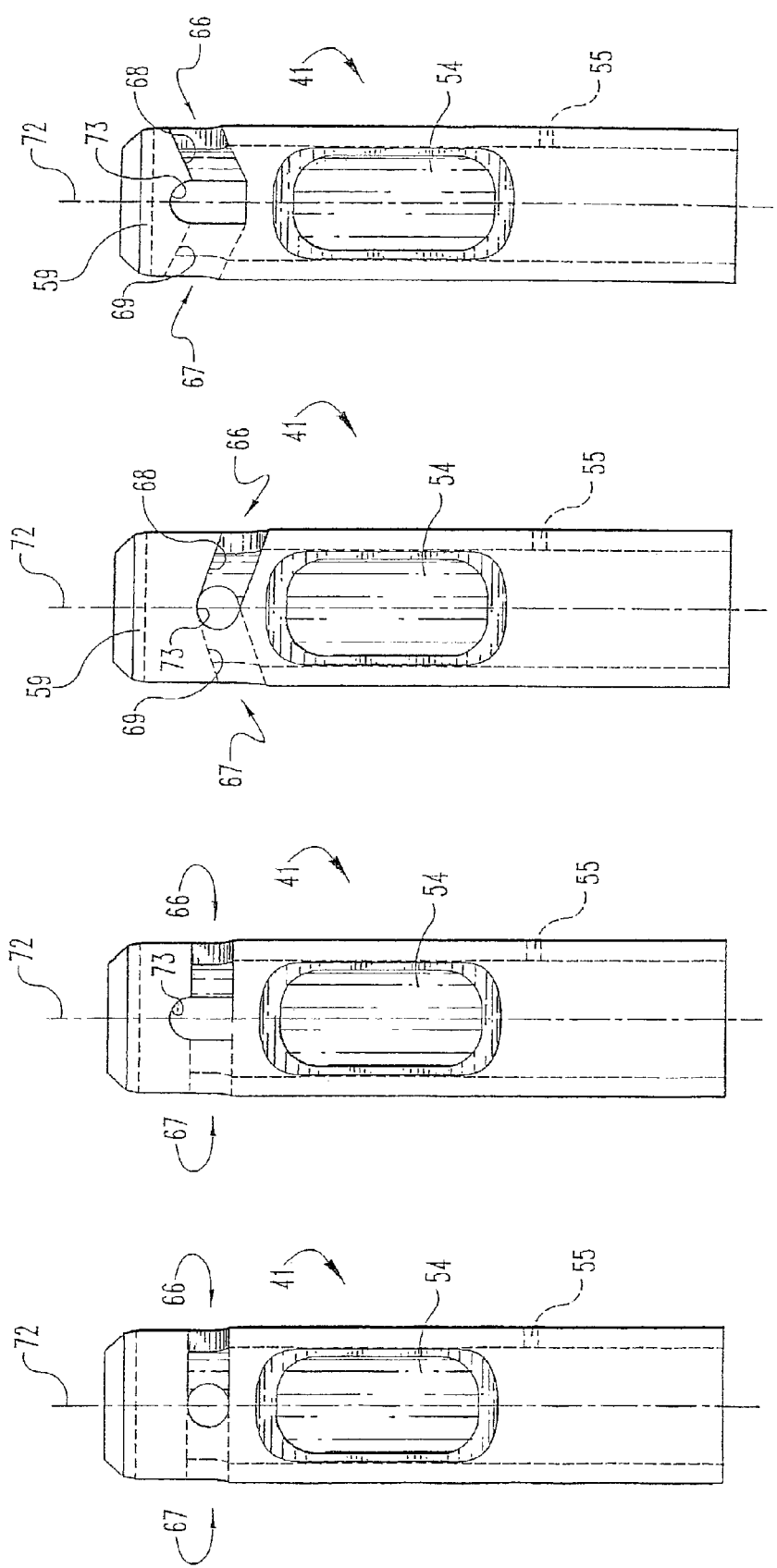

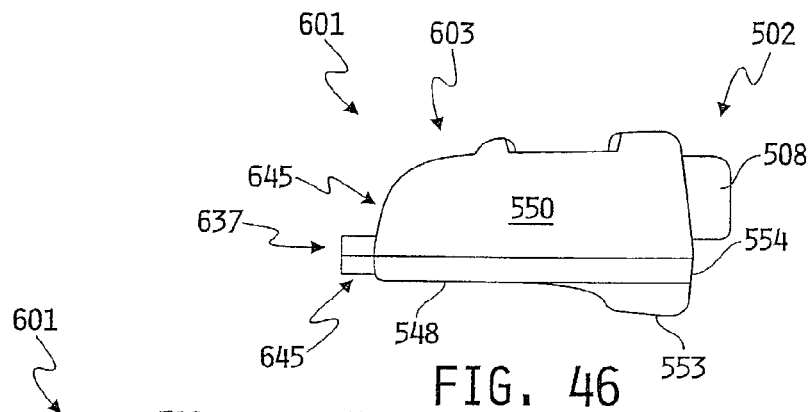
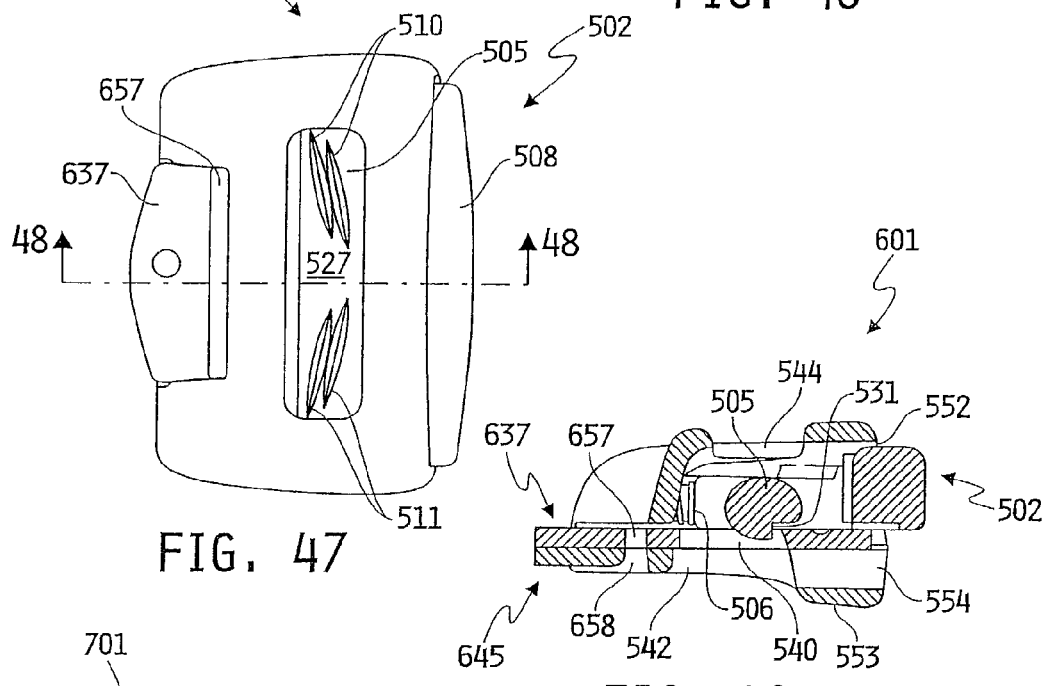
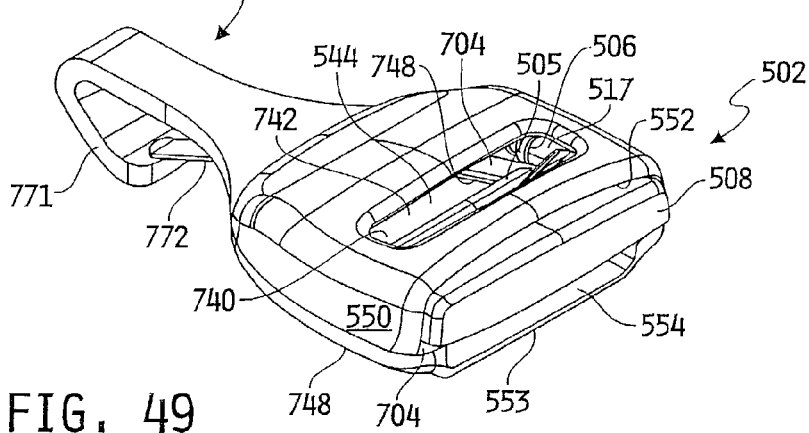

WEB ADJUSTER AND COUPLING

CROSS-REFERENCE TO RELATED APPLICATIONS

This application is a continuation-in-part of co-pending application Ser. No. 10/206,660, filed Jul. 26, 2002 now U.S. Pat. No. 6,820,310, which is a continuation-in-part of application Ser. No. 09/472,258 filed, Dec. 27, 1999, which issued as U.S. Pat. No. 6,425,632 to Anthony et al. on Jul. 30, 2002, and which is a continuation-in-part of application Ser. No. 09/135,908, filed Aug. 18, 1998, which issued as U.S. Pat. No. 6,017,087 to Anthony et al. on Jan. 25, 2000, and which claims priority to, and the benefit of, U.S. Provisional Patent Applications No. 60/307,899, filed Jul. 26, 2001, and No. 60/394,099, filed Jul. 5, 2002, all of the above disclosures of which are expressly incorporated herein by reference.

FIELD OF THE INVENTION

This invention relates to a combination coupling and web adjuster used to adjust the operative length of a belt or webbing.

BACKGROUND AND SUMMARY OF THE INVENTION

This invention relates to the field of web adjusters used to adjust a length of a web or belt. One known pertinent prior art is commonly owned U.S. Pat. No. 4,876,770. It is desirable to provide a connector in combination with a web adjuster configured to engage a length of web at some point along its length. In one aspect an illustrative embodiment comprises a web adjuster portion and a connector portion. The combination web adjuster and connector portions may be combined in a monolithic structure, which may be made of plastic. The combination may also comprise individual adjuster and connector portions that are coupled together by suitable means such as by the use of rivets, melting, adhesives and the like. In addition, all or portions of the illustrative web adjuster device may be manufactured out of any suitable metallic, non-metallic, or composite material by any method of manufacture appropriate for such material.

The connector portion illustratively may comprise a snap hook portion which opens upwardly relative-to the bottom surface of the combination web adjuster device. The snap hook portion may alternatively open downwardly relative to the bottom surface of the combination web adjuster device. In either event, the snap hook portion illustratively may, but need not, comprise a spring or keeper that covers the opening.

The web adjuster portion or assembly may comprise any conventional web adjuster. Illustratively, the web adjuster portion comprises a frame including a web stop and a gripping assembly configured to provide a gripping portion having a gripping surface substantially parallel to the web stop. The web adjuster further includes one or more biasing members acting between the frame and the gripping assembly to capture a web.

BRIEF DESCRIPTION OF THE DRAWINGS

FIG. 2 is an enlarged perspective view of a rotary coupling attached to a fixedly mounted rigid member according to one embodiment of the present invention.

FIG. 3 is a plan view of a fixedly mountable rigid member.

FIGS. 8, 9, 10, and 11 are plan views alternative embodiments of a cylinder that may be used in a rotary coupling according to the present invention.

FIG. 46 is a side view of a reduced-profile adjuster according to one embodiment of the present invention.

FIG. 47 is a top view of a reduced-profile adjuster showing the gripping pattern according to one embodiment of the present invention.

FIG. 48 is a partial side sectional view of a reduced-profile adjuster with the release button in the depressed position according to one embodiment of the present invention.

FIG. 49 is a perspective view of a combination snap hook and web adjuster according to one embodiment of the present invention.

DESCRIPTION OF THE ILLUSTRATIVE EMBODIMENTS

Figure 1:
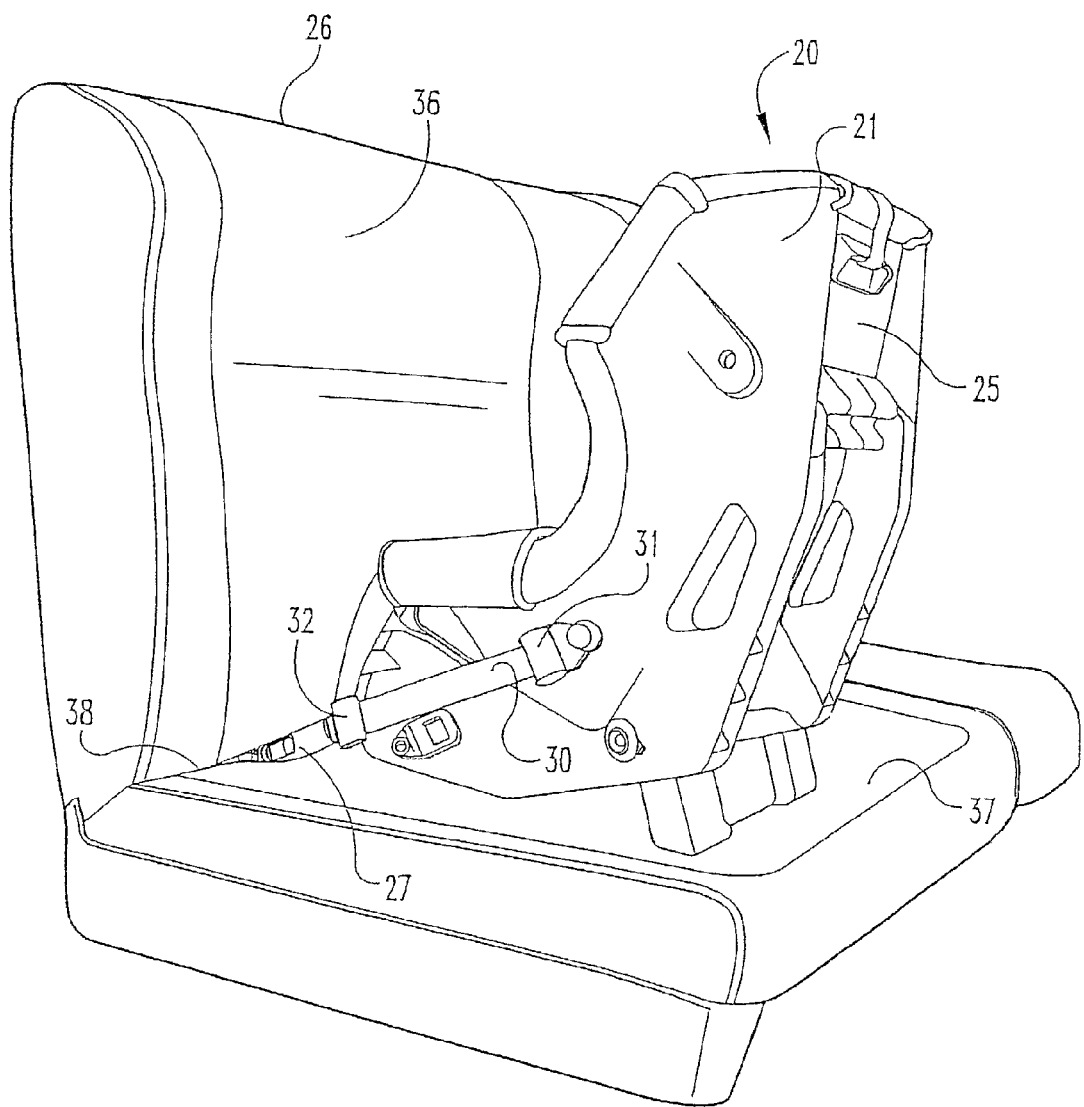
FIG. 1 is a perspective view of a passenger seat and a rearwardly facing child seat incorporating one embodiment of the present invention.

For the purpose of promoting an understanding of the principles of this invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein are contemplated as would normally occur to one of average skill in the art to which the invention relates.

Referring to FIG. 1, child's infant seat 20 is shown placed on top of automobile seat 26. Seat 20 includes a plastic main body 21 that is molded to receive a child in the sitting position the seat portion is generally concave in configuration and is integrally joined to back portion 25. For the child's comfort, a flexible and washable cushion preferably resides over both the seat and back portions.

Seat 20 is coupled by one, or alternatively at least two, rotary coupling(s) 27 to passenger seat 26 with a separate web or belt 30 tying or securing each coupling to seat 20. For clarity, only one rotary coupling 27 is shown in FIG. 1. However, a second coupling, similar to the one that is shown, can be mounted on the other side of seat 20. the proximal end of web 30 includes a conventional web adjuster 31 that is mounted, optionally with a pivot, to seat 20. An example of such a web adjuster is described in U.S. Pat. No. 4,660,889 to Anthony et al., U.S. Pat. No. 5,031,962 to Lee, or U.S. Pat. No. 4,876,770 to Bougher, the disclosures of which are specifically incorporated into the specification by reference. The distal end of web or belt 30 is then attached to the proximal end of rotary coupling 27 in any conventional manner, such as with pins, rivets, stitching 738, or another web adjuster 32. If web adjuster 32 is used, one may omit web adjuster 31 and mount the proximal end of web 30 directly to seat 20. Upon attachment to seat 20. web adjuster 31 may then be used to adjust the tension or tightness of web 30 when seat 20 is attached to passenger seat 26.

A closer view of rotary coupling 27 engaged to a fixedly mountable rigid member 35 is shown in FIG. 2. Referring back to FIG. 1, fixedly mountable rigid member 35 (not shown) can be mounted in most any conventional manner to passenger seat 26 in bite 38 between back support 36 and seat support 37. In general, at least one rigid member 35 is mounted in seat bite 38 for every rotary coupling 27 that is used to attach infant seat 20 to passenger seat 26, generally one on each side of seat 20. And referring to FIG. 3, rigid member 35 is typically round in cross-section of which one example is an Anchorage World Universal 6-millimeter bar.

Figure 4:
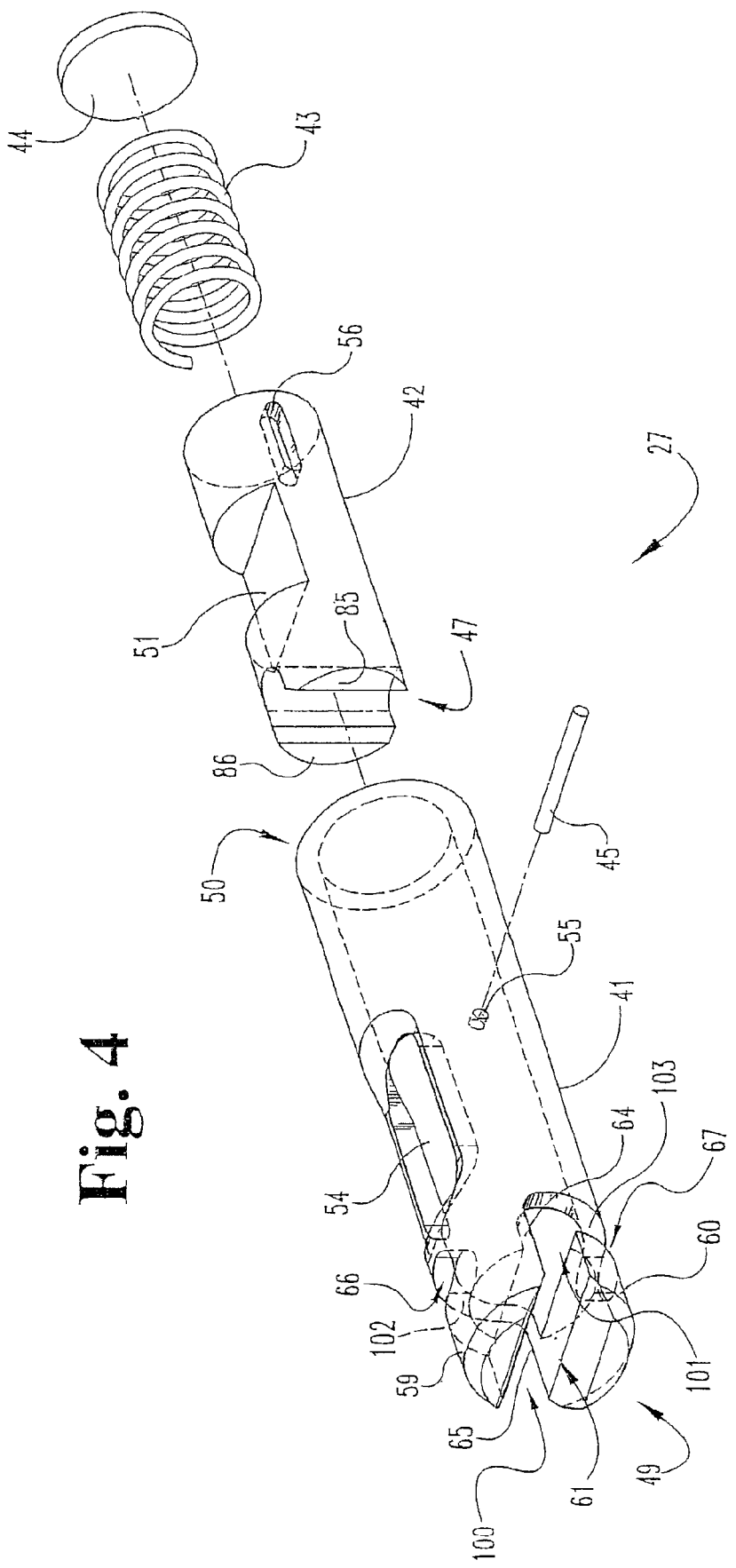
FIG. 4 is an exploded view of a rotary coupling according to one embodiment of the present invention.

An exploded view of rotary coupling 27 is presented in FIG. 4. Rotary coupling 27 generally includes rigid hollow cylinder 41, piston 42 spring 43, end 44, and pin 45. Rotary coupling 27 is assembled by sliding piston 42, external end 47 first, inside rigid hollow cylinder 41. Once inside, piston 42 has sufficient clearance to allow it to reciprocally slide inside rigid hollow cylinder 41, between distal end 49 and proximal end 50. Piston 42 further includes a finger groove 51, which is aligned with access opening 54 and which is adapted to receive a human finger. Finger groove 51 is then maintained in alignment with access opening 54 by pin 45 that extends through hole 55 and into guide groove 56. A spring 43 or other biasing means is then placed behind piston 42 to urge piston 42 toward the distal end 49. Thereafter, end 44 is placed behind spring 43 to hold both spring 43 and piston 42 in position. End 44 can be attached to rigid hollow cylinder 41 in most any conventional fashion, for example, as by welding end 44 to cylinder 41.

Optionally and once the rotary coupling is assembled, a raised button (not shown) adapted to receive a human finger can be attached to piston 42 through access opening 54, over finger groove 51. The raised button can then be used to both manually slide piston 42 inside cylinder 41 and maintain piston 42 in alignment with rigid cylinder 42 by sliding against the sides of access opening 54. Accordingly if the raised button is present, one may omit pin 45 and alignment groove 56 from the rotary coupling shown in FIG. 4.

Figure 5:
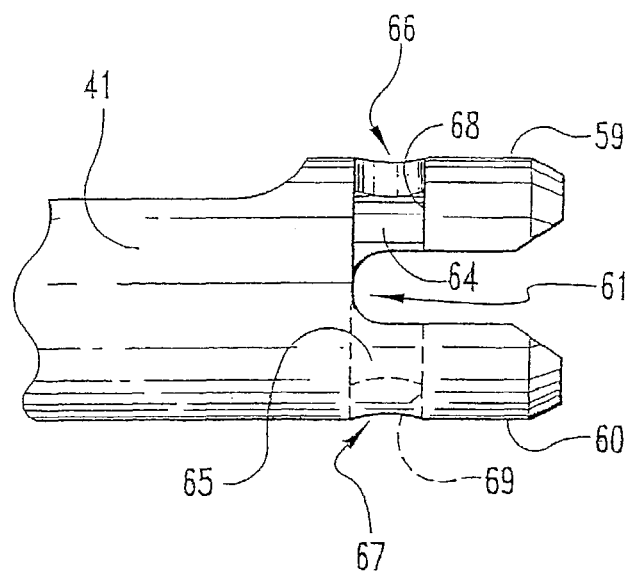
FIG. 5 is a side view of the distal end of a rotary coupling according to one embodiment of the present invention.
Figures 6, 7:
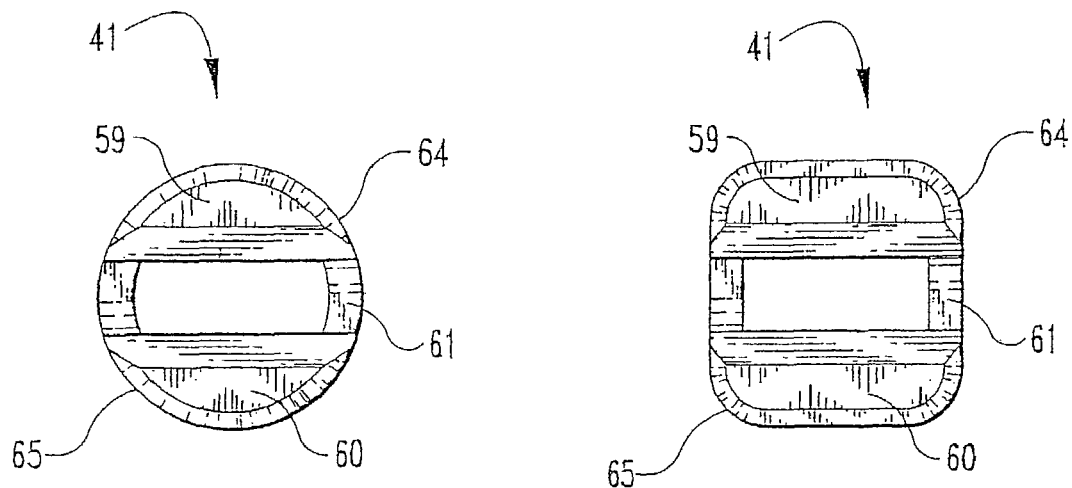
FIG. 6 is an end view of the distal end of a rotary coupling according to one embodiment of the present invention.
FIG. 7 is an end view of the distal end of a rotary coupling according to one embodiment of the present invention.

A side view of distal end 49 on rigid hollow cylinder 41 is presented in FIG. 5 and an end view of distal end 49 is presented in FIG. 6. Simultaneously viewing these figures and FIG. 4, two fingers, 59 and 60, are laterally attached by their opposite proximal ends, 64 and 65, across the open end 61 of cylinder 41. Fingers 59 and 60 are attached slightly spaced from open end 61, which forms notches, 66 and 67, between the proximal edge of each finger, 68 and 69, and open end 61. Notches 66 and 67 are mutually opposed and include respectively slots 100 and 101 extending in the direction of the longitudinal axis of cylinder 41. Slots 100 and 101 open respectively into slots 102 and 103 extending around the cylinder's longitudinal axis. As presented below, fingers 59 and 60 and notches 66 and 67, are generally used to attach the rotary coupling to fixedly mounted member 35. However, if fingers 59 and 60 are optionally mounted over open end 61 as shown, fingers 59 or 60 can also serve to hold piston 42 inside a the rotary coupling when the coupling is not engaged to a fixedly mounted member 35 since the wall thickness 104 of fingers 59 and 60 is greater than the wall thickness of cylinder 41.

FIG. 7 presents an alternative embodiment of rigid hollow cylinder 41. Besides the circular cross-section shown in FIG. 6, cylinder 41 and piston 42 may also be generally square, as shown, as well as have other non-circular cross-sections such as hexagonal, octagonal, or even oval. And should the practitioner choose a non-circular cross-section, the practitioner may again remove pin 45 and groove 56 from coupling 27. Being non-circular, the mating sides of cylinder 41 and a complementarily shaped piston 42 may be used to maintain cylinder 41 and piston 42 in proper alignment.

FIG. 8 presents a plan view of rigid hollow cylinder 41-as shown in previous figures with notches 66 and 67 that are generally perpendicular to longitudinal axis 72. However besides perpendicular, the notches may also take other forms. For example and referring to FIG. 9, notches 66 and 67 may also include a seat 73 that is adapted to receive rigid member 35, when rotary coupling 27 is engaged to rigid member 35. Or referring to FIGS. 10 and 11, the proximal edges, 68 and 69, of fingers 59 and 60 may also be oriented at an oblique angle to longitudinal axis 72, which similarly offers a seat 73 against which rigid member 35 may reside.

Figure 12:
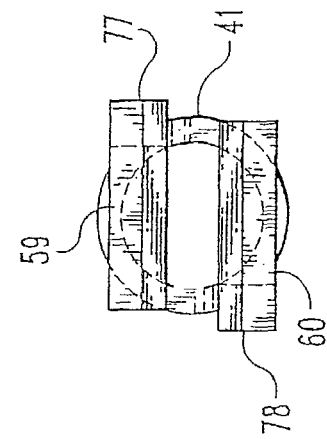
FIGS. 12, 13, and 14 are respectively end, side, and top view of one embodiment of the present invention.
Figure 14:
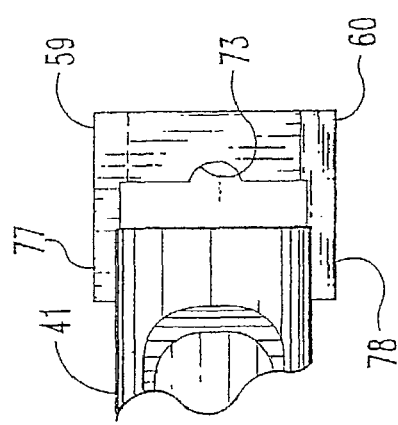
Figure 13:
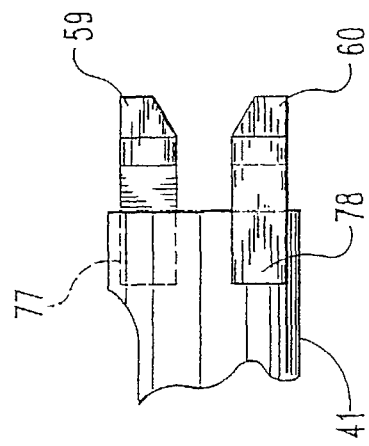

Referring now to FIGS. 12, 13, and 14 there is shown an alternative embodiment to attaching fingers 59 and 60 to rigid hollow cylinder 41. In previous figures, fingers 59 and 60 were presented contiguous to rigid hollow cylinder 41; that is, fingers 59 and 60 were shown cut or molded into the same piece of material as cylinder 41. Alternatively, fingers 59 and 60 may start as separate pieces and then be attached to rigid hollow cylinder 41 in any conventional manner such as welding legs 77 and 78, which are attached to fingers 59 and 60, to opposite sides of cylinder 41.

Figure 15:
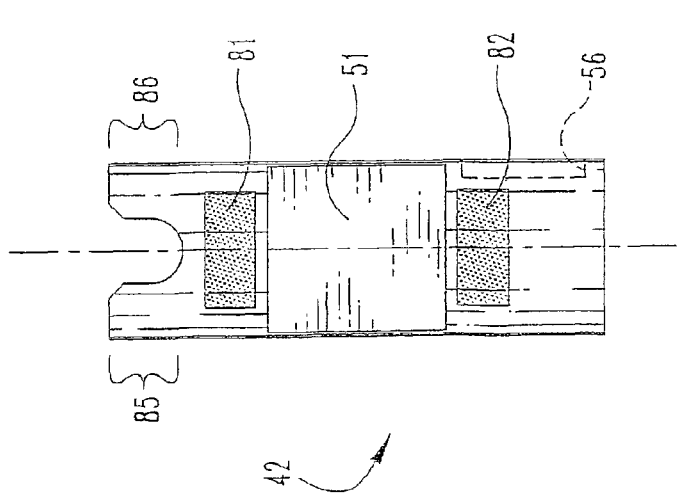
Figure 18:
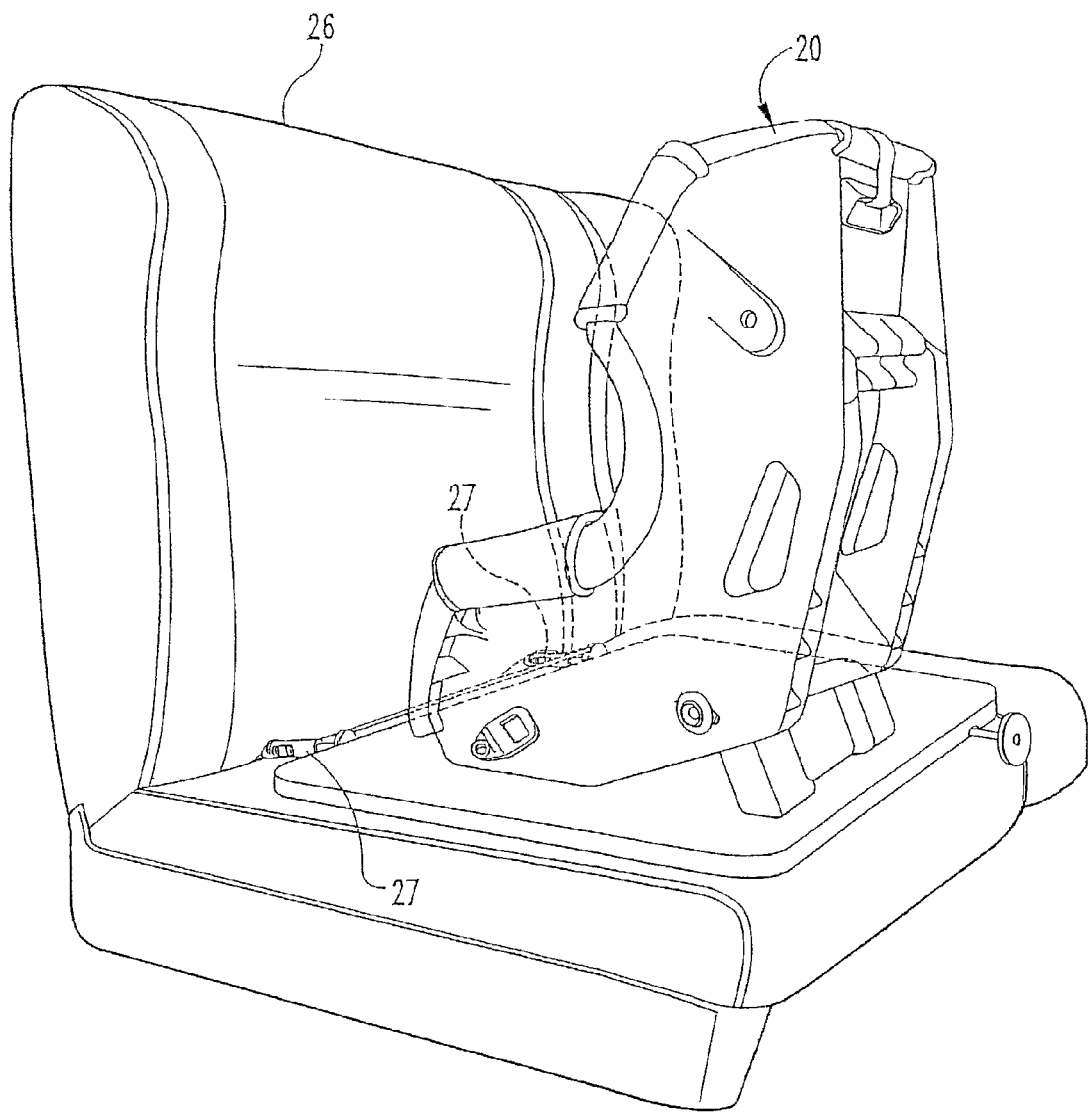
FIG. 18 is a perspective view of a passenger seat and a rearwardly facing child seat incorporating one embodiment of the present invention.

A plan view of piston 42 is presented in FIG. 15. Piston 42 optionally includes an indicator to inform the user when the piston is either proximally or distally displaced within rigid hollow cylinder 41. The indicator is provided by colored portions 81 and 82 located on piston 42. When proximally displaced, colored portion 81 is readily visible through access opening 54 and colored portion 82 is hidden under rigid hollow cylinder 41. Then when piston 42 is distally displaced, colored portion 82 becomes readily visible, and colored portion 81 becomes hidden. In this regard, it is contemplated that colored portions 81 and 52 have different colors to allow the user to know at a glance what position piston 42 resides.

Figure 17:
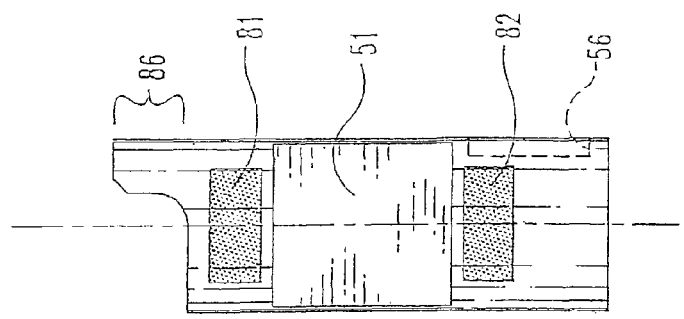
FIGS. 15, 16, and 17 are plan views of alternative embodiments of a piston that may be used in a rotary coupling according to the present invention.
Figure 16:
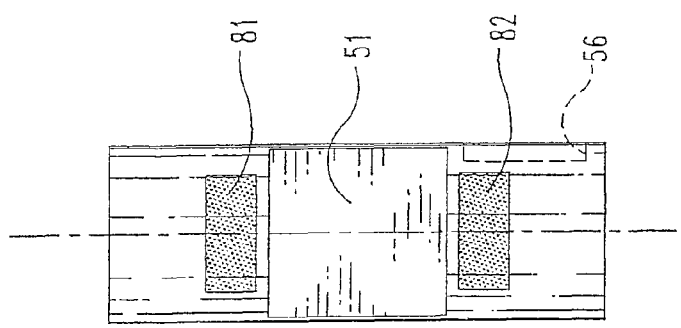

Still referring to FIG. 15, piston 42 optionally includes two pawl blocks, 55 and 86. Pawl blocks 85 and 86 are extensions of piston 42 forming a groove to contact rigid member 35. When coupling 27 is rotated, as described more fully below, member 35 is positioned within slots 102 and 103, and the groove contacts rigid member 35. With rotary coupling 27 and rigid member 35 thusly engaged, pawl blocks 55 and 86 reside on either side of member 35 and prevent member 35 from sliding out of either notch 66 or 67. FIG. 16 shows an alternative embodiment of the piston 42 that omits the pawl blocks, and FIG. 17 presents yet another alternative embodiment where only one pawl block, 86, is present.

Rotary coupling 27 is engaged to rigid member 35 by first placing rigid member 35 between fingers 59 and 60 and then pushing rotary coupling 27 against rigid member 35 until rigid member 35 becomes aligned with slots 102 and 103 of notches 66 and 67. This movement pushes piston 42 to a proximal position inside cylinder 41 and compresses spring 43. Once rigid member 35 is aligned with slots 102 and 103 of notches 66 and 67, the rotary coupling is twisted about its axis to place fixedly mounted rigid member 35 within slots 102 and 103 and then the coupling is released. With the coupling released, spring 43 decompresses and presses piston 42 against rigid member 35, which holds rigid member 35 within rotary coupling 27.

Rotary coupling 27 is then released from rigid member 35 by first accessing piston 42 through access opening 54 with a human finger. Once the human finger is located at groove 51, piston 42 can be pulled back to a proximal position within cylinder 41. With piston 42 located in a proximal position, spring 43 is recompressed and the spring's force against rigid member 35 is released. With the force released, rotary coupling 27 is then twisted around its longitudinal axis in a direction that is opposite of that which was previously used to engage coupling 27 and member 35. Rotary coupling 27 is then twisted until rigid member 35 exits slots 102 and 103 and is aligned with slots 100 and 101. Rigid member 35 is then slid past fingers 59 and 60, and out of out of rotary coupling 27.

Figure 19:
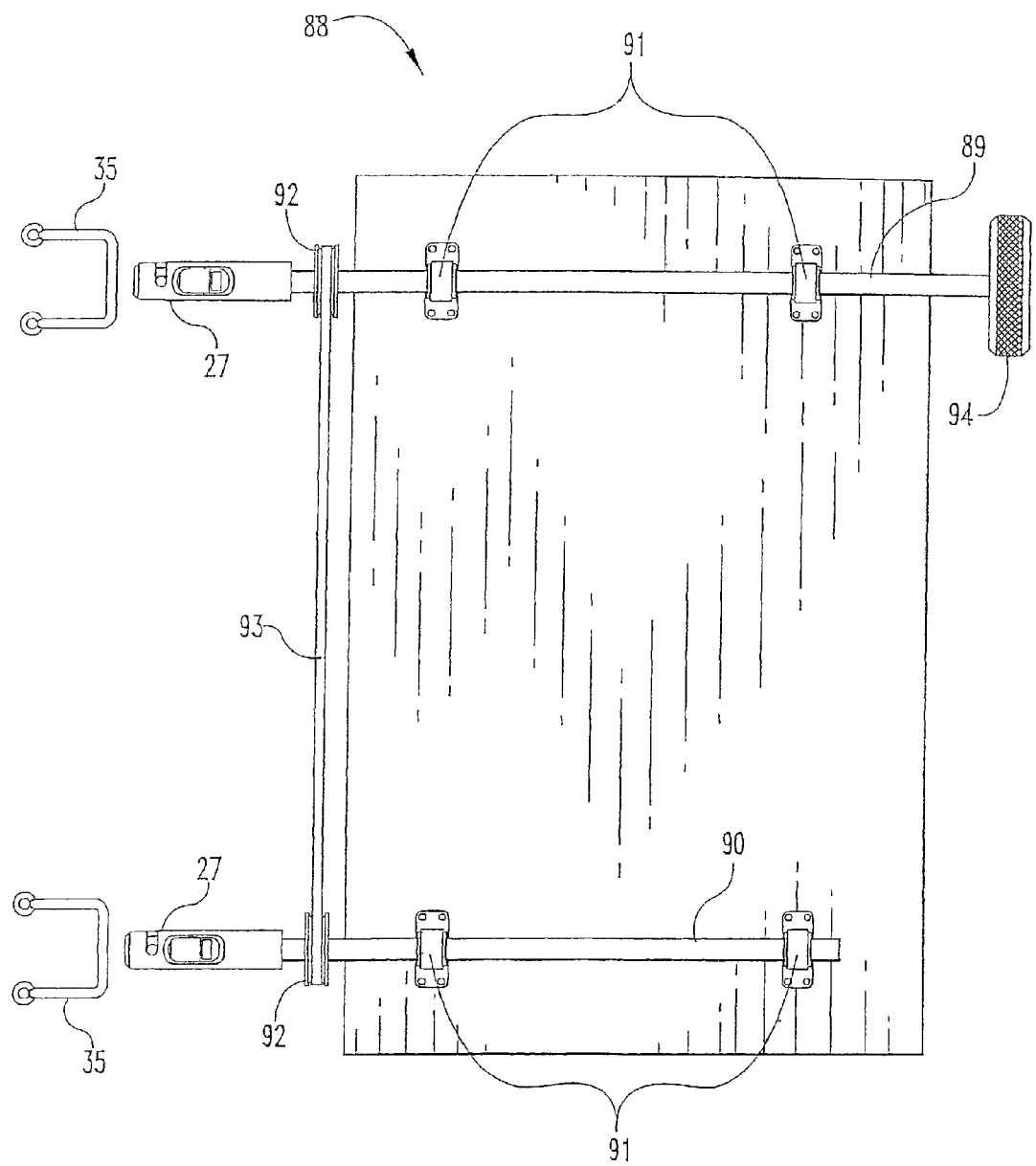
FIG. 19 is a plan view of a rigid plate according to one embodiment of the present invention.

Referring to FIG. 19, another embodiment of this invention is presented with infant seat 20 mounted in most any conventional manner atop rigid platform 88. The platform, rather than the seat, is then attached to passenger seat 26 by rotary couplings 27. Referring to FIG. 19, rigid platform 88 has two shafts, 89 and 90, which are rotatably attached through bearings 91 to platform 88. Shafts 89 and 90 each include a pulley or gear 92 that are mutually connected by a belt or chain 93. A rotary coupling, 27, is then mounted to the distal end of each shaft. Arranged in this fashion, both couplings can then be simultaneously twisted around their longitudinal axis by turning knob 94.

This latter embodiment is operated by aligning each rotary coupling 27 with a rigid member 35 that was previously mounted in the bite of a passenger seat. Each rigid member is then pushed between the fingers in each rotary coupling, which simultaneously pushes each piston 42 to a proximal position inside the coupling. The rigid members are pushed past the fingers until each rigid member aligns with the notches in its rotary coupling. Then once aligned, both rotary couplings are simultaneously twisted around each rigid member 35 by turning knob 94. Piston 42 and spring 43 in each rotary coupling then hold each rigid member 35 within notches 66 and 67, which in turn, securely holds the infant seat in the passenger seat of a vehicle. Optionally, belt 93 and pulleys 92 can be omitted from this embodiment and each shaft can be operated by a separate knob.

Figure 20:
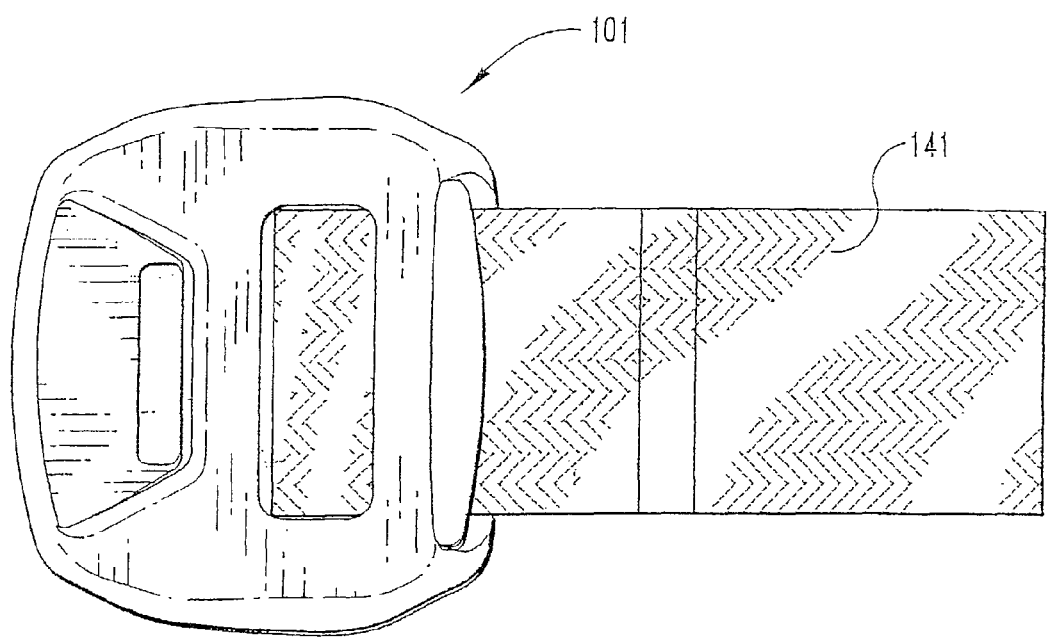
FIGS. 20-22 are respectively top, side, and cross-sectional views of a web adjuster according to one embodiment of the present invention.
Figure 21:
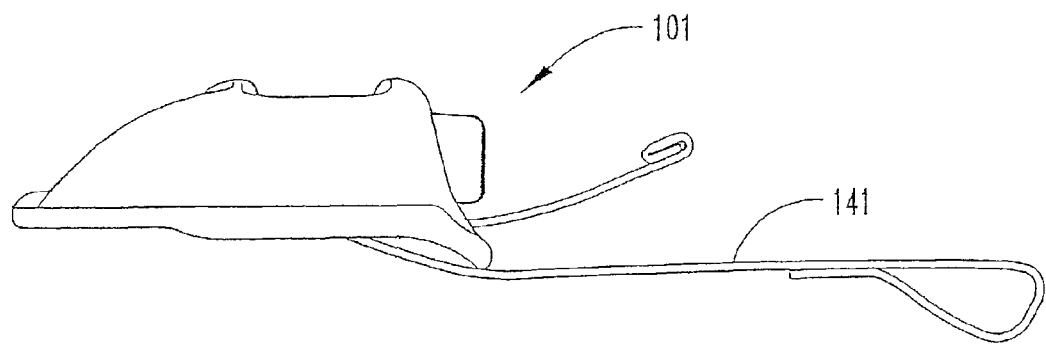
Figure 22:
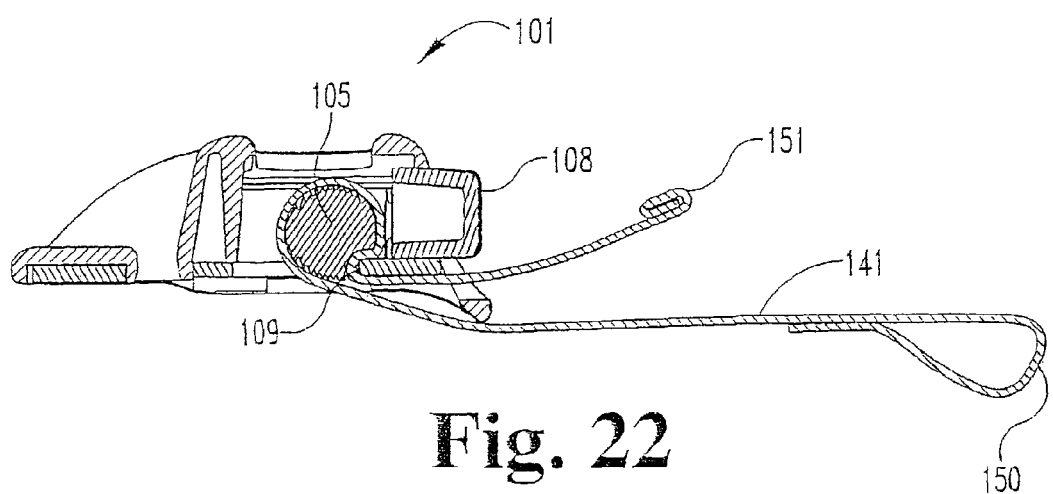
Figure 23:
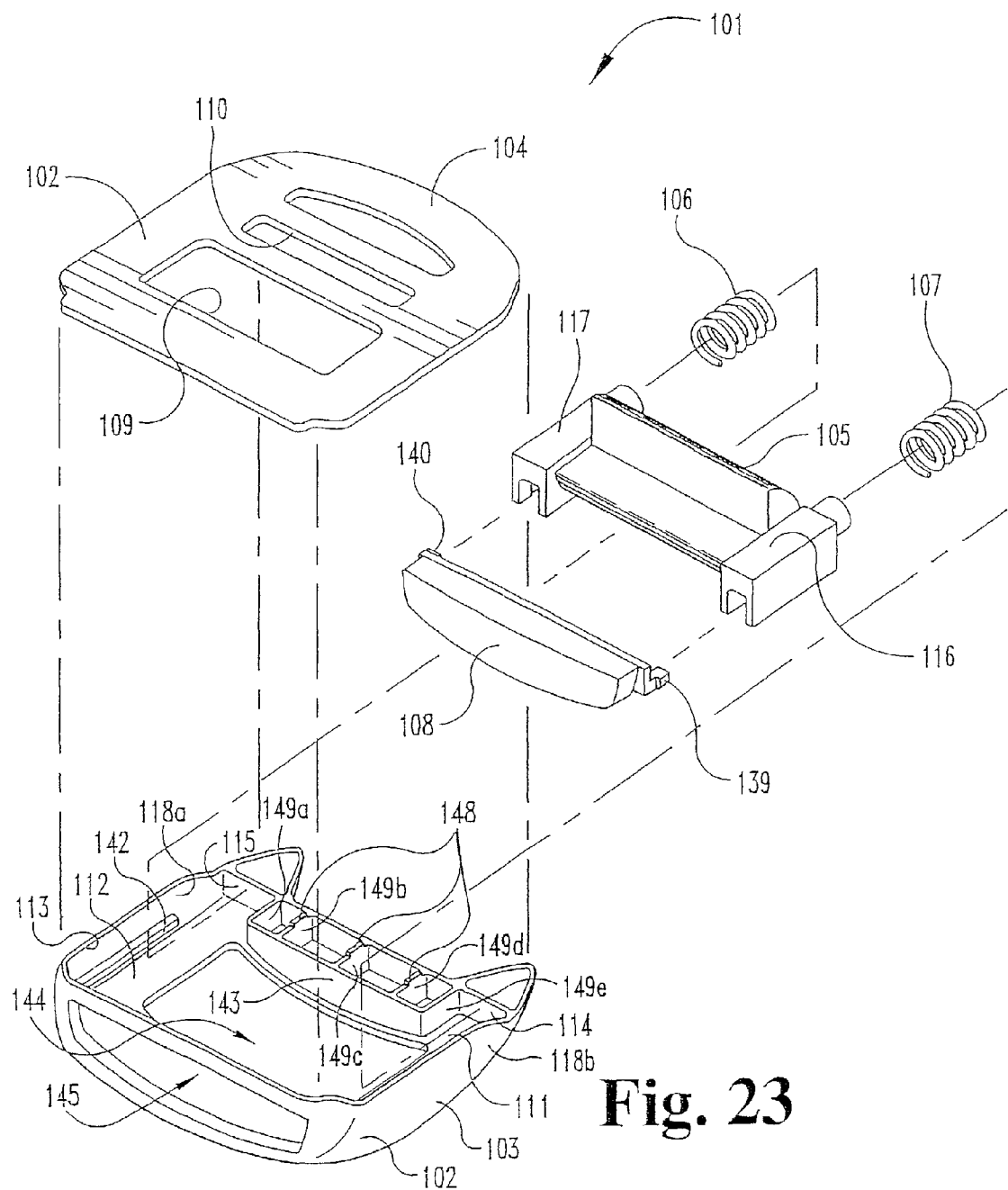
FIG. 23 is an exploded view of a web adjuster according to one embodiment of the present invention.
Figure 24:
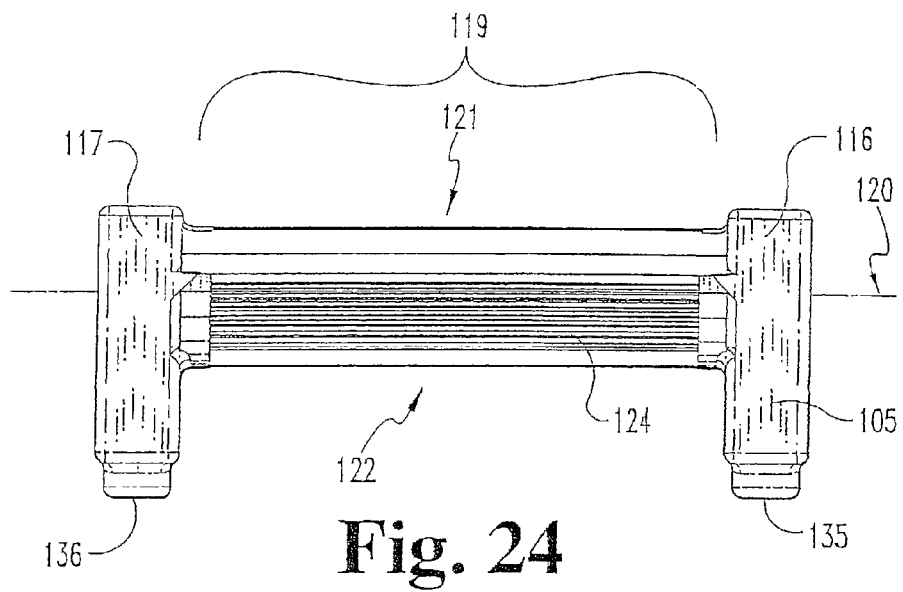
FIGS. 24-28 are respectively bottom, back, top, cross-sectional, and perspective views of a web gripping bar according to one embodiment of the present invention.
Figure 25:
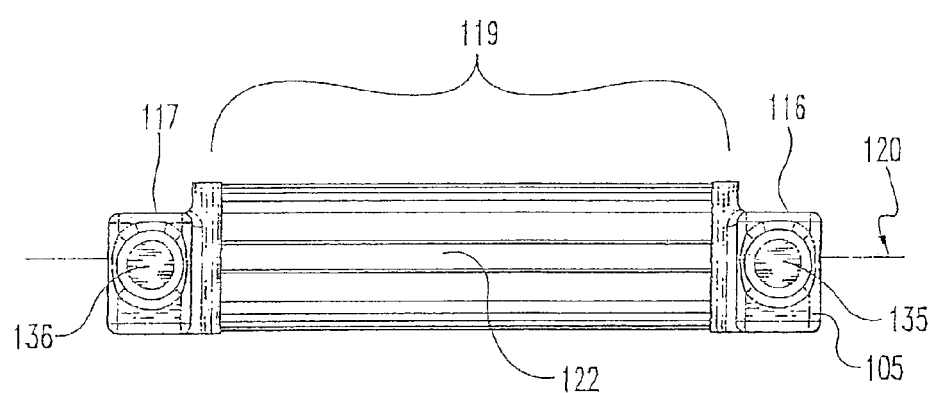
Figure 26:
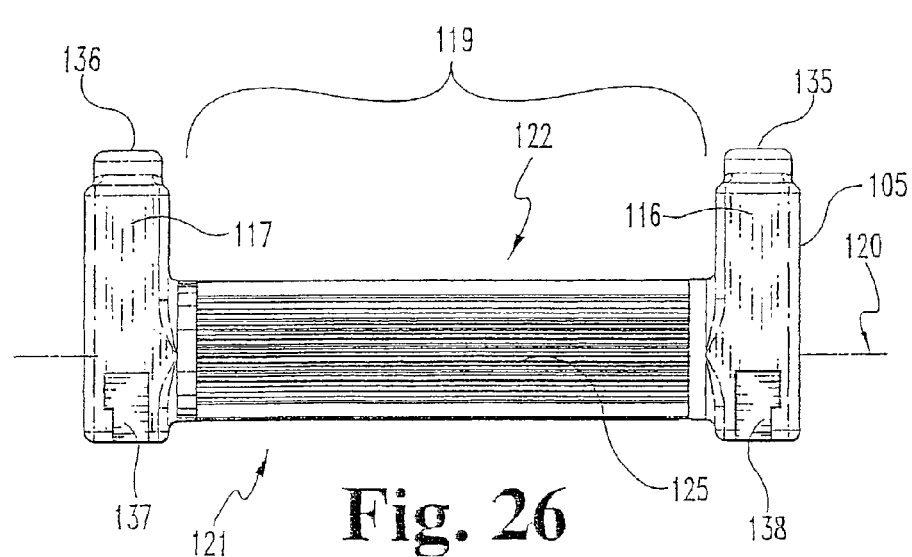

In addition to the conventional web adjusters, 31 and 32, shown in FIG. 1, one may also utilize web adjuster 101, shown in FIGS. 20-22 in this invention. Referring now more particularly to FIG. 23, there is shown an exploded view of web adjuster 101. Web adjuster 101 includes a bar 105, two springs 106 & 107, a button 108, a frame 102; which may be conceptually subdivided into housing 103 and plate 104; and a web 141, previously depicted in FIGS. 20-22.

Figure 28:
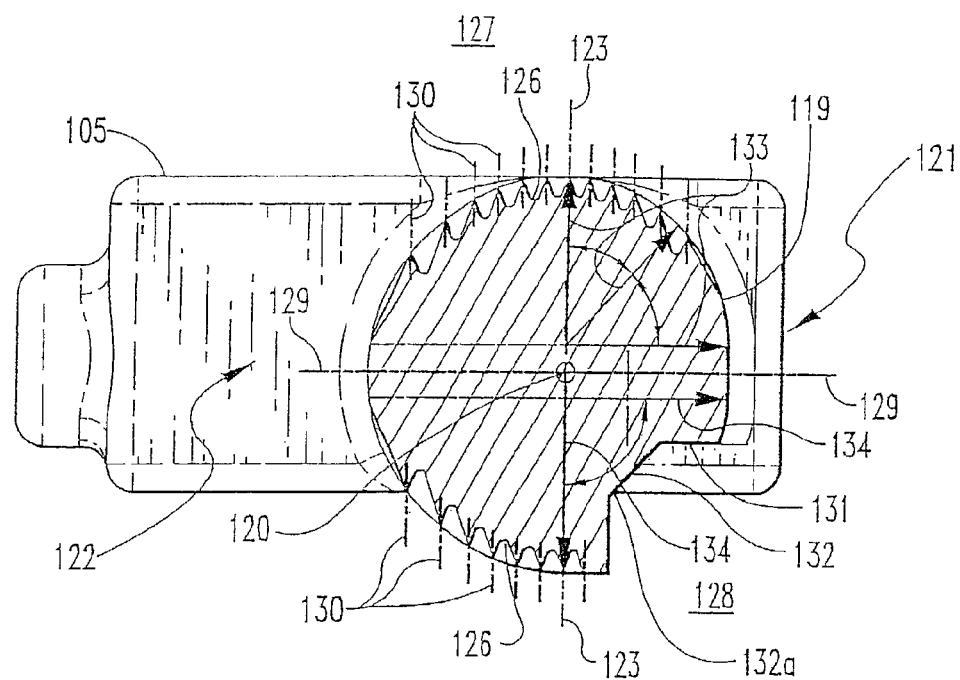
Figure 27:
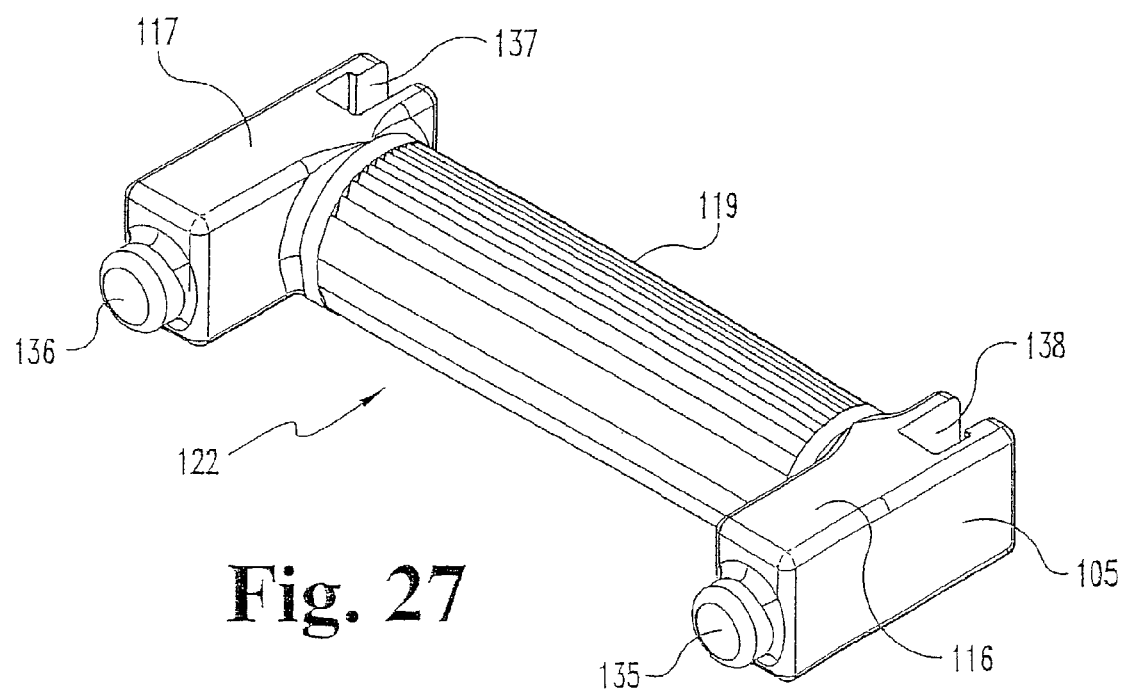

Details of bar 105 are shown in FIGS. 24-28. Bar 105 may be characterized as having a generally cylindrical body 119 with a longitudinal axis 120, a front face 121, a back face 122, and a frontal plane 123 (FIG. 28). Frontal plane 123 is important to convey the preferred placement of serrated portions 124 and 125. Referring to FIG. 28, each of these serrated portions is formed by cutting or molding grooves 126 in the top 127 or bottom 128 of cylindrical body 119. But notably, these grooves are preferably placed on top 127 or bottom 128 in planes 130 that are parallel with frontal plane 123 (or perpendicular to median plane 129). instead of placing the grooves in planes that share longitudinal axis 120. Wear on the web is generally reduced when grooves 126 are placed parallel with frontal plane 123. The front face 121 of cylindrical body 119 also preferably includes a longitudinal notch 131. Longitudinal notch 131 is placed in front face 121 so as to butt against web stop 109 on plate 104, and preferably includes bevel 132 to assist bar 105 in seating against web 141 and web stop 109. In this most preferred embodiment, web 141 is held between point 132a on bevel 132 and the top edge of web stop 109 on plate 104. Still further, front face 121 is preferably slightly thinner in cross-section than back face 122. For example, shortened radii 133 and 134 are preferably continued around front face 121 until they are parallel with median plane 129 to give central body 119 a generally elliptical cross-section. The longitudinal axis 120 is contained in frontal plane 123, which contains the max uppermost point on the top 127 and the maximum lowermost point on the bottom 128. As viewed in FIG. 28, all radii defining the back face 122 intersect longitudinal axis 120, and are greater than or equal to all radii defining front face 121.

Bar 105 also includes ears 116 & 117, which are mounted near each end of cylindrical body 119. As shown, these projections are preferably rectangular in shape, and extend away from the longitudinal axis of bar 105, from back face 122. Nonetheless, it is also contemplated that ears 116 & 117 may have other shapes and laterally extend from other sides of cylindrical body 119, such as from front face 121. Ears 116 & 117 provide torsional rigidity to bar 105 such that bar 105 will neither turn nor deform as force is applied to end 150 of web 141. Ears 116 & 117 preferably include tabs 135 & 136, as well as slots 137 & 138. Tabs 135 & 136 are sized to accept an end of springs 106 & 107, and slots 137 & 138 are sized to accept interlocking tabs 139 & 140 on button 108 (FIG. 23).

Housing 103 is generally concave in shape, the bottom/opening of which is shown in FIG. 23. Housing 103 contains two channels 111 & 112, which are largely defined by walls 118a & 118b and ear guides 142, which are included along the inside of housing 103. A backstop 143 is then preferably included inside housing 103 between the ends 114 & 115 of channels 111 & 112. Backstop 143 is preferably-supported by walls 149a-e. Beyond the foregoing structures, housing 103 preferably also includes access opening 144, which exposes the top of bar 105 and button opening 145 to provide access to front face 121 of bar 105.

With housing 103 formed in this fashion, web adjuster 101 is initially assembled by placing button 108 inside button opening 145. Bar 105 then rests inside housing 105 with ears 116 & 117 sliding in channels 111 & 112, between ear guides 142 (one ear guide each side of bar 105). As shown, bar 105 is oriented in these channels such that a on tabs 135 & 136 face channel ends 114 & 115, such that the longitudinal notch 131 faces plate 104 (discussed below), and such that slots 137 & 138 engage interlocking tabs 139 & 140 on button 108. Helical springs 106 & 107 are then inserted inside channels 111 & 112 between channel ends 114 & 115 and tabs 135 & 136.

The assembly of web adjuster 101 may then be completed by wrapping web 141 around bar 105 as shown in FIG. 22 and by covering the bottom of housing 103 with plate 104. Plate 104 is preferably made of metal and shaped to fit inside the edges 113 of the walls 118a & b of housing 103. Plate 104 has a web stop 109 (FIGS. 22 & 23), which mates against web 141 and longitudinal notch 131 on bar 105. Housing guide 110 then helps to insure that plate 104 remains in this position by receiving guide tabs 148 on walls 149b-d. Web adjuster 101 is then operated by pressing button 108, which releases the grip of bar 105 on web 141. With the grip released, end 150 of web 141 can be extended by pulling end 150 away from adjuster 101. End 151 can be extended whether button 108 is pushed or not by pulling end 151 away from adjuster 101.

Figure 1A:
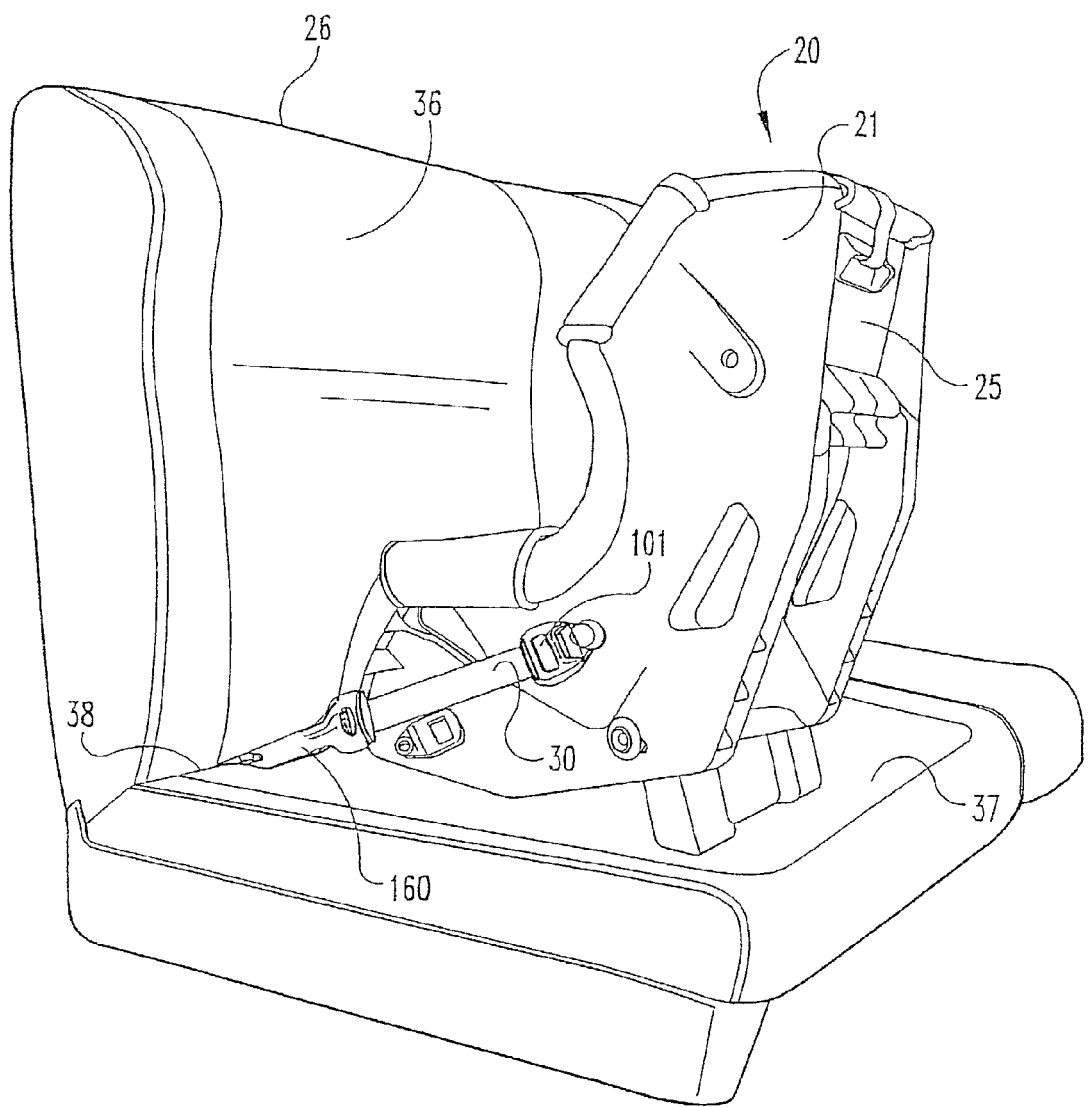
FIG. 1A is a perspective view of a passenger seat and a rearwardly facing child seat incorporating another embodiment of the present invention.
Figure 29:
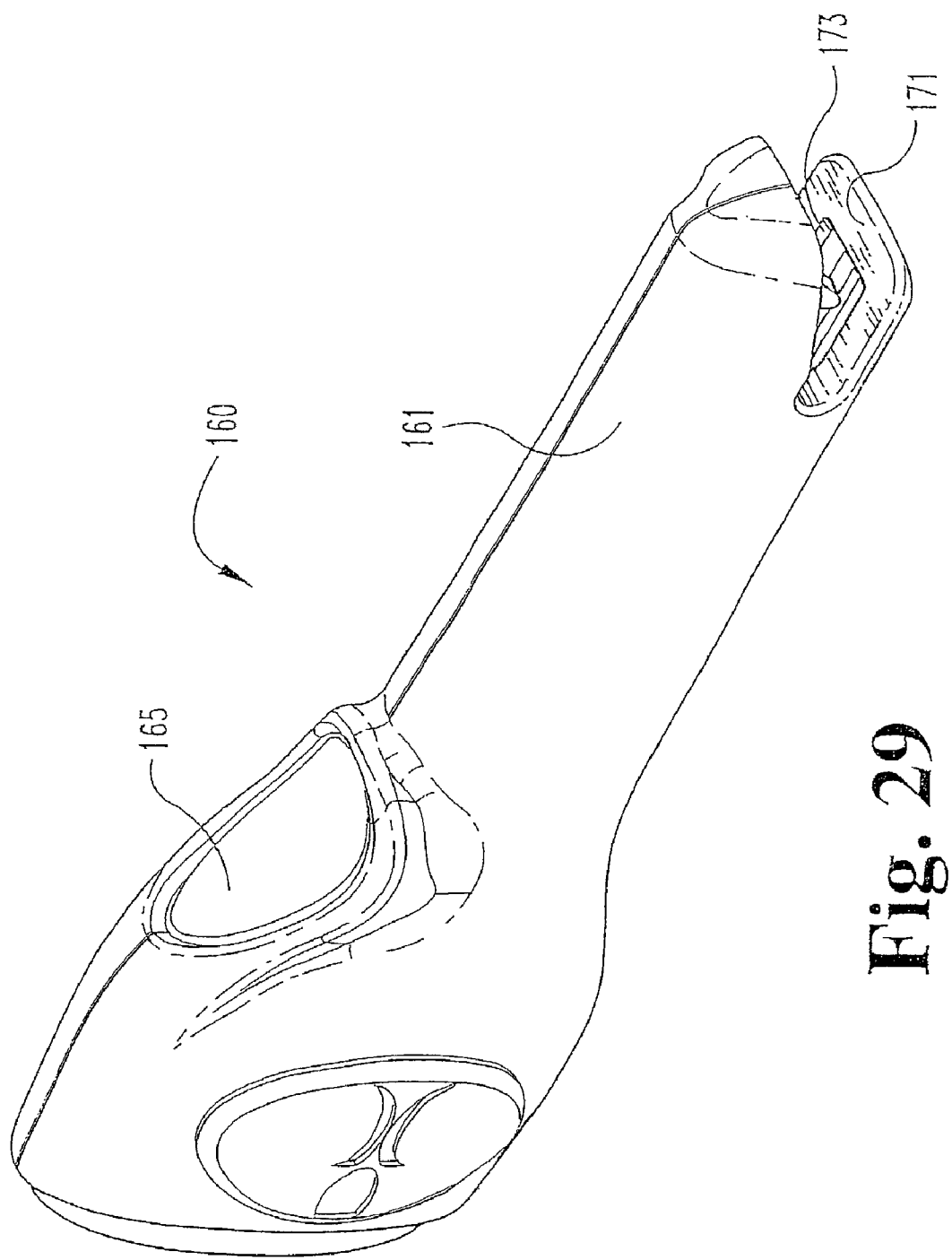
FIGS. 29-32 are respectively perspective, top, side, and end views of a connector according to one embodiment of the present invention.
Figure 30:
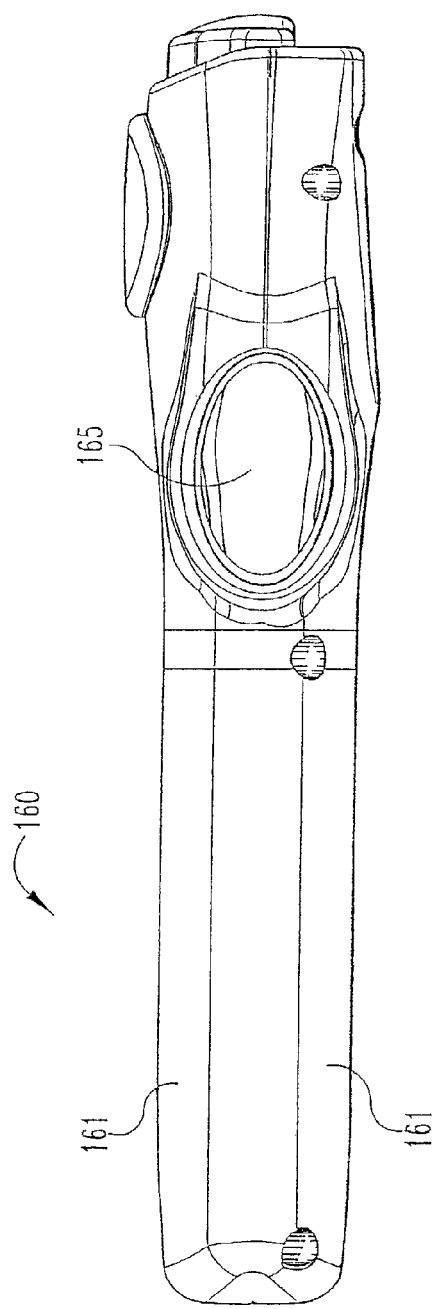
Figure 32:
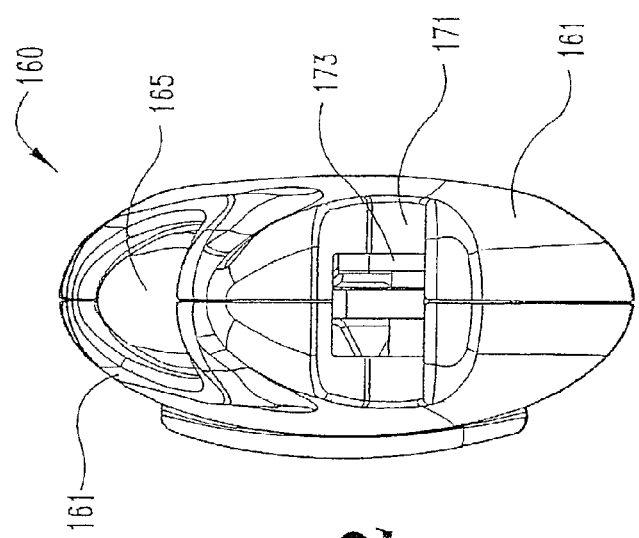
Figure 31:
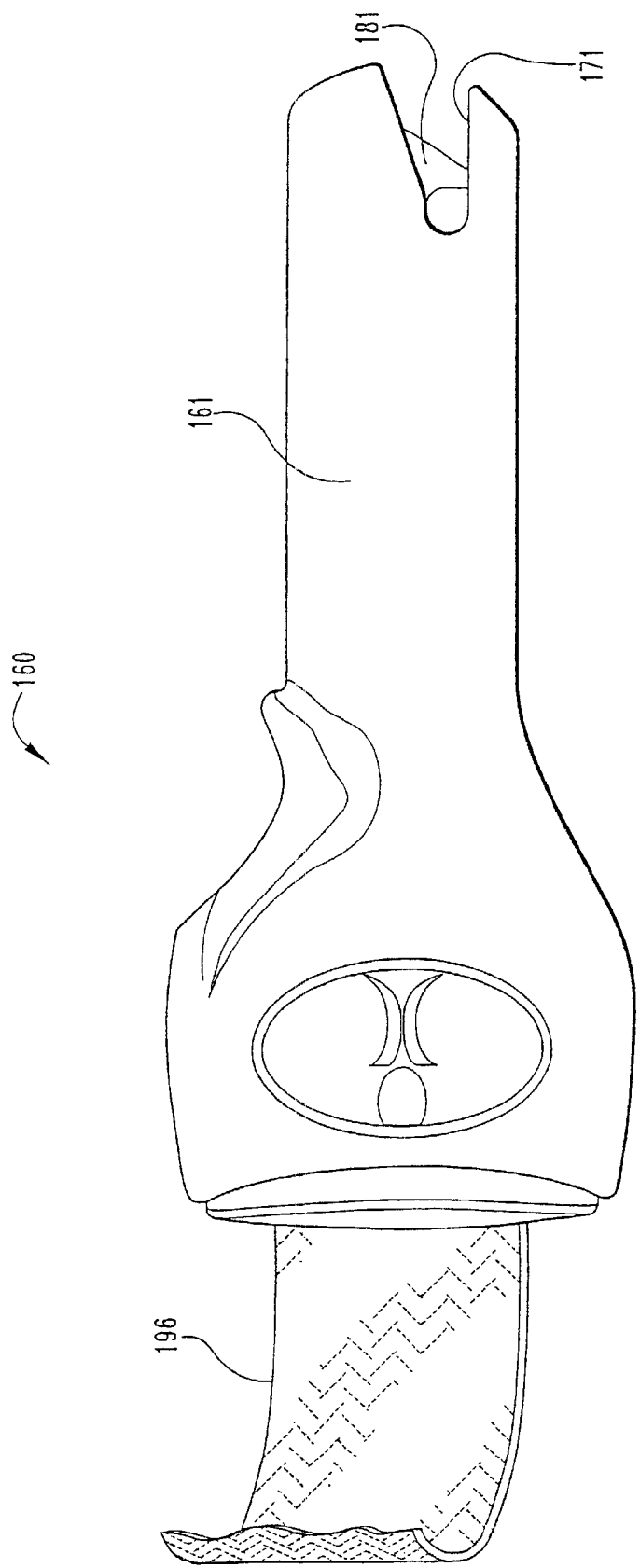
Figure 33:
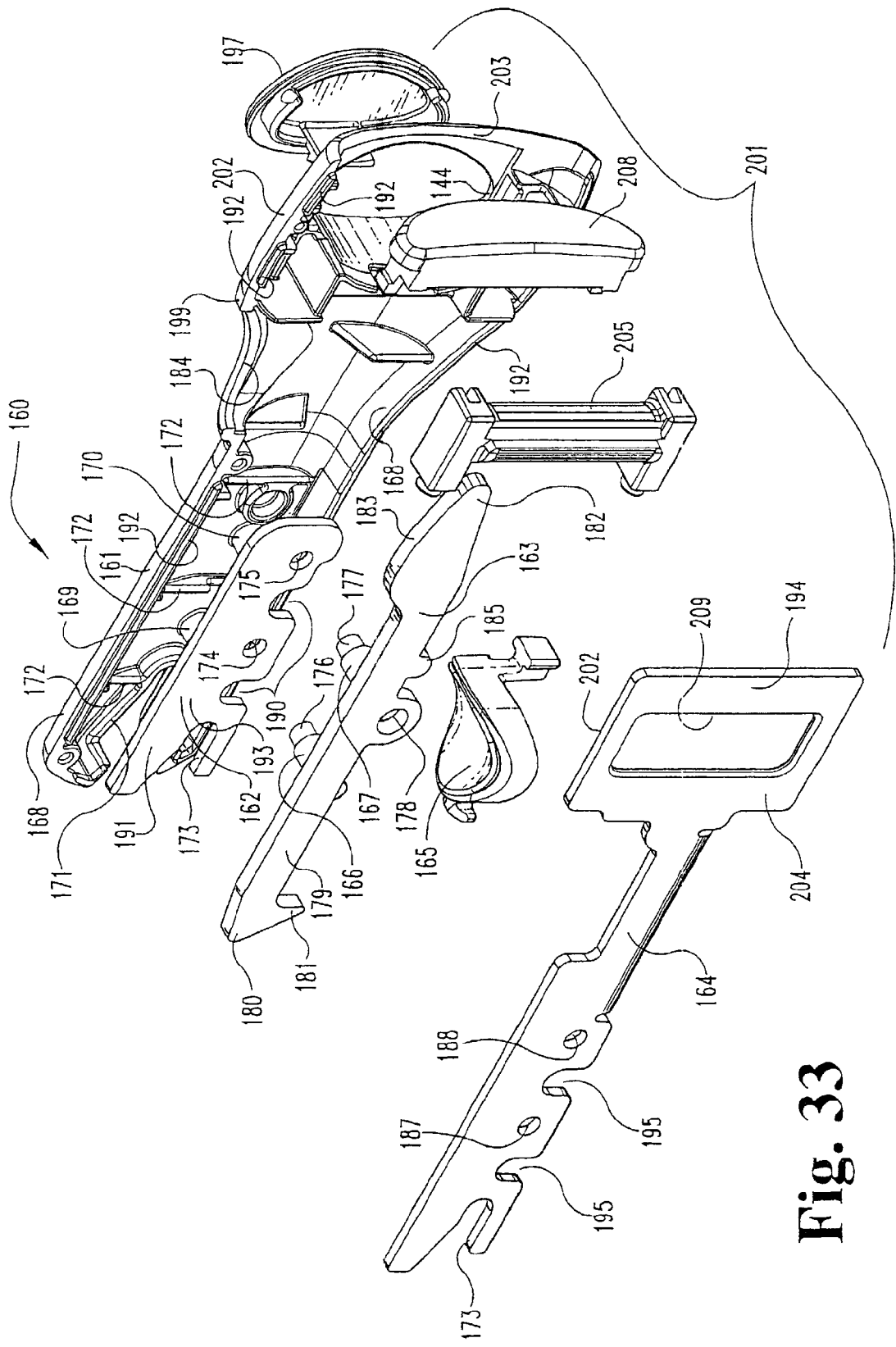
FIG. 33 is an exploded view of a connector according to one embodiment of the present invention.

Referring to FIG. 1A, in yet another alternative embodiment of the present invention, connector 160 shown in FIG. 29 may be substituted for rotary coupling 27. Top, side, and front views of this device are respectively shown in FIGS. 31-33. Referring now more particularly to FIG. 33, there is shown an exploded view of part of connector 160. Connector 160 includes housing 161, a plate 162, a lever 163, a plate 164, button 165, spring 186 (FIGS. 34 & 35) and pins 166 & 167.

Housing 161 is preferably injection molded from plastic into a generally concave shape that is largely defined on each side by walls 168. Housing 161 has plugs 169 & 170 and guides 192, which mate with complementary structures on the other half of housing 161, which has been omitted from FIG. 33 for clarity. Both halves of housing 161 have retaining walls 172 to hold plates 162 or 164 inside housing 161, against the top of plugs 169 & 170. Finally, housing 161 has a notch 171, which is sized to allow a fixedly mounted rigid member (not shown) to be placed inside the mouth 173 of plates 162 & 163.

The plate 162 is preferably made of metal and is sized to fit inside the walls 168 and beneath retaining walls 172 of housing 161. As shown, first plate 162 is also preferably formed at 190 to fit around plugs 169 & 170. The intermediate portion 193 of first plate 162 has two holes 174 & 175, which upon assembly, receive the tapered ends 176 & 177 of preferably metal pins 166 & 167. The distal end 191 of first plate 162 has a mouth 173 that is sized to receive a fixedly mountable rigid member (not shown). But in this regard, mouth 173 is preferably formed wider toward its distal end than its proximal end to allow the user to more easily place a fixedly mounted rigid member into the bottom of mouth 173.

Lever 163 is preferably made of metal and is sized to move inside the housing of connector 160, between plates 162 & 164. Lever 163 contains a hole 178 to pivot on pin 167. In contrast, pin 166 only supports the body 179 of lever 163 when connector 160 is left in the normally closed position. The distal end 180 of lever 163 has a downward projecting finger or tooth 181. Tooth 181 is preferably of a length to cover the distal opening of mouth 173 when connector 160 is resting in a normally closed position. The proximal end 182 of lever 163 has a button engagement surface 183 to ride against the bottom of button 165, button 165 being located in opening 184 of housing 161, directly above button engagement surface 183. Finally, lever 163 also has a projection 185, which upon assembly is sized to accept the end of spring 186 (FIGS. 34 and 35) to hold spring 186 in position against lever 163.

Plate 164 is also preferably made of metal and resides next to lever 163. Complementary to the profile of plate 162, plate 164 also contains holes 187 & 188 that are sized to receive the opposite tapered ends (omitted for clarity) of pin 166 and 167, and a mouth 173 that is sized to receive a fixedly mountable rigid member. Plate 164 is sized to fit inside housing 161, and again similar to plate 162 is also formed at 195 to fit around the plugs that attach to 169 & 170. The proximal end 194 of plate 164 is discussed below.

Figure 34:
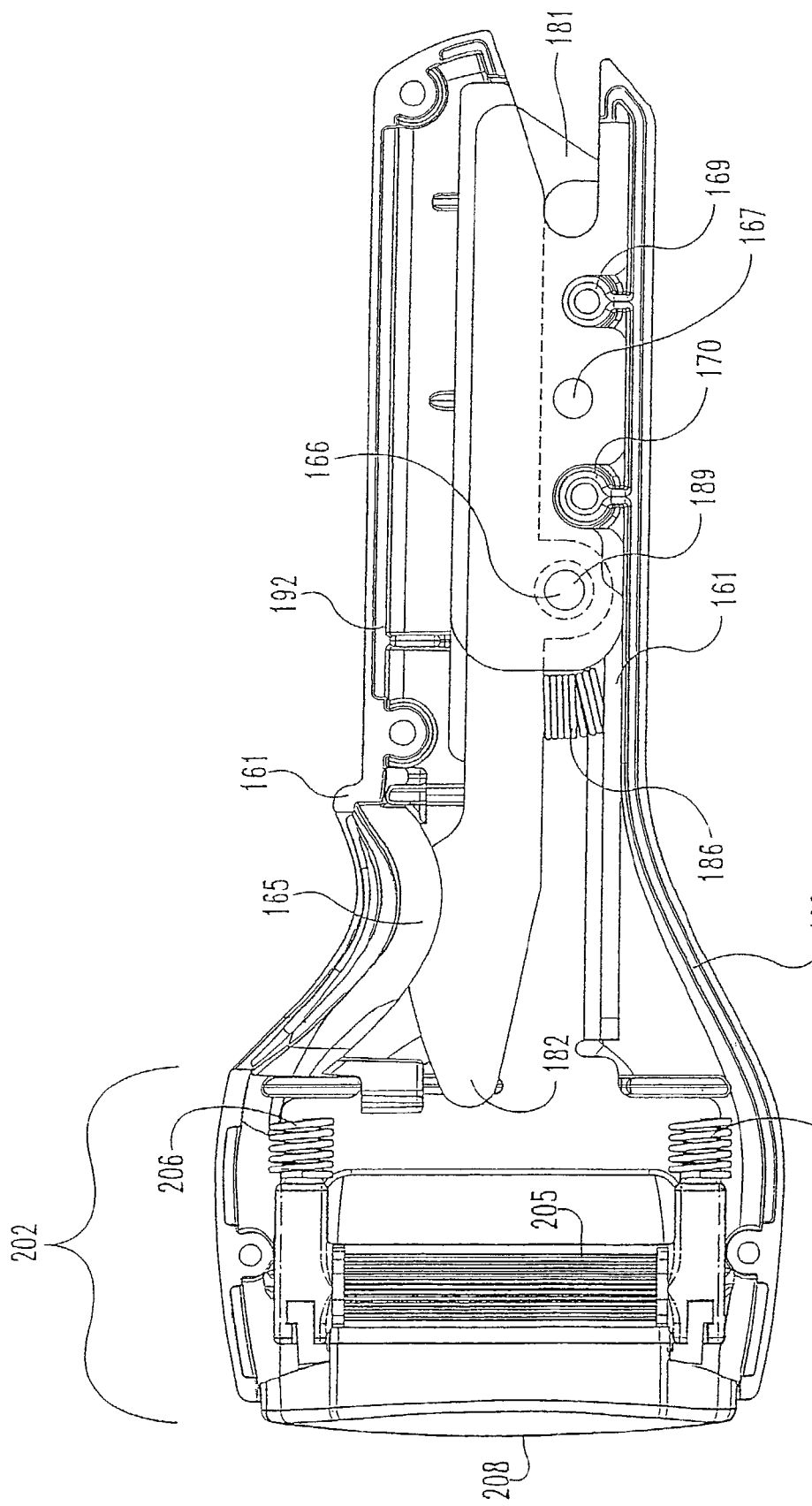
FIG. 34 is a side cross-sectional view of a connector in a closed position according to one embodiment of the present invention.
Figure 35:
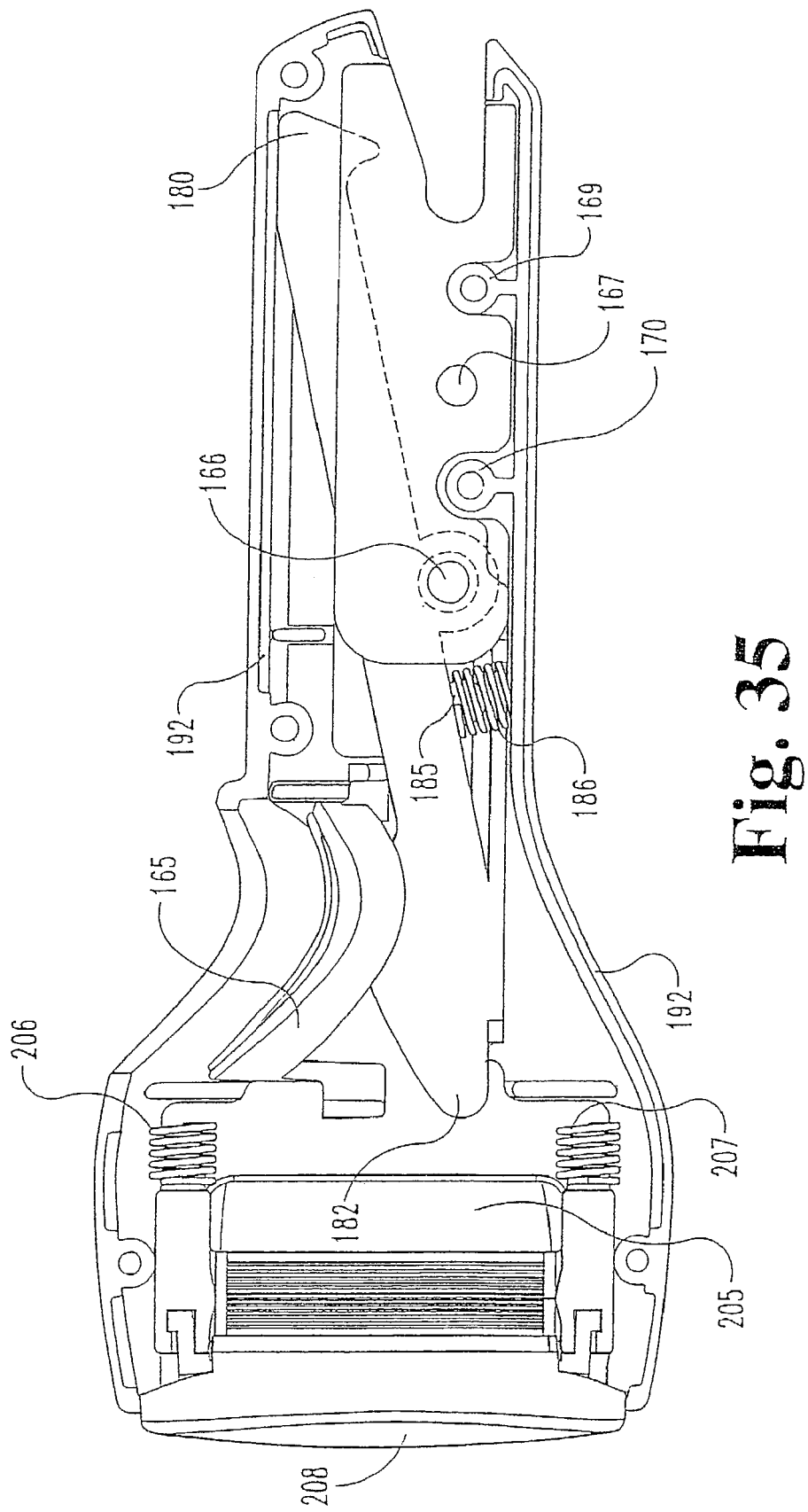
FIG. 35 is a side cross-sectional view of a connector in an open position according to one embodiment of the present invention.

Assembled in this fashion, connector 160 has a normally closed position shown in FIG. 34 and an open position shown in FIG. 35. In the closed position, spring 186 pushes against housing 161 and lever 163 at projection 185. at a location that is proximal to pivot point 189. Thusly extended, spring 186 urges button 165 up against housing 161 and simultaneously holds finger 181 on lever 163 in mouth 172 between plates 162 & 164 to cover mouth 172 and close connector 160. Connector 160 is opened by pushing downward on button 165 and compressing spring 186, which in turn, lifts distal end 180 and pulls finger 181 out of mouth 172. With lever 163 relocated in this manner, mouth 172 is ready to receive a fixedly mountable rigid member.

Figure 58:
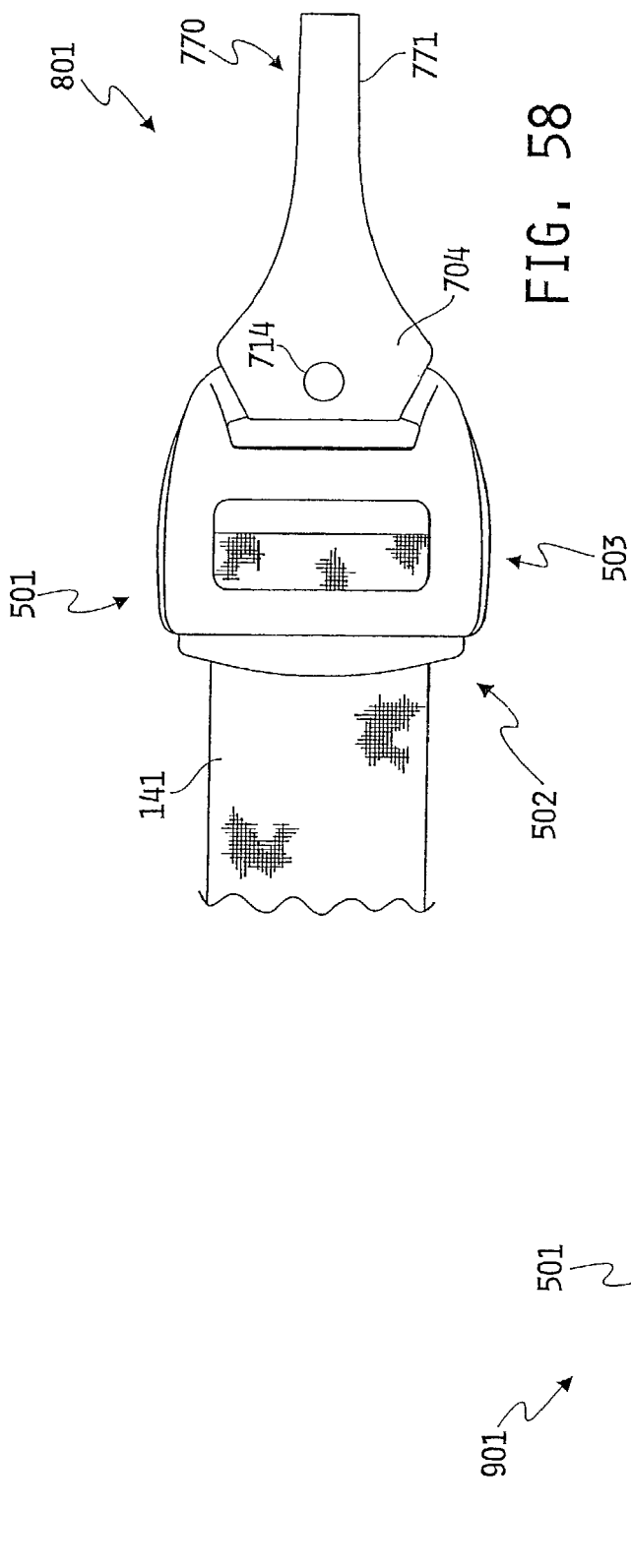
FIG. 58 is a top view of an illustrative embodiment of a web adjuster coupled to a snaphook and showing a web threaded through the adjuster.
Figure 59:
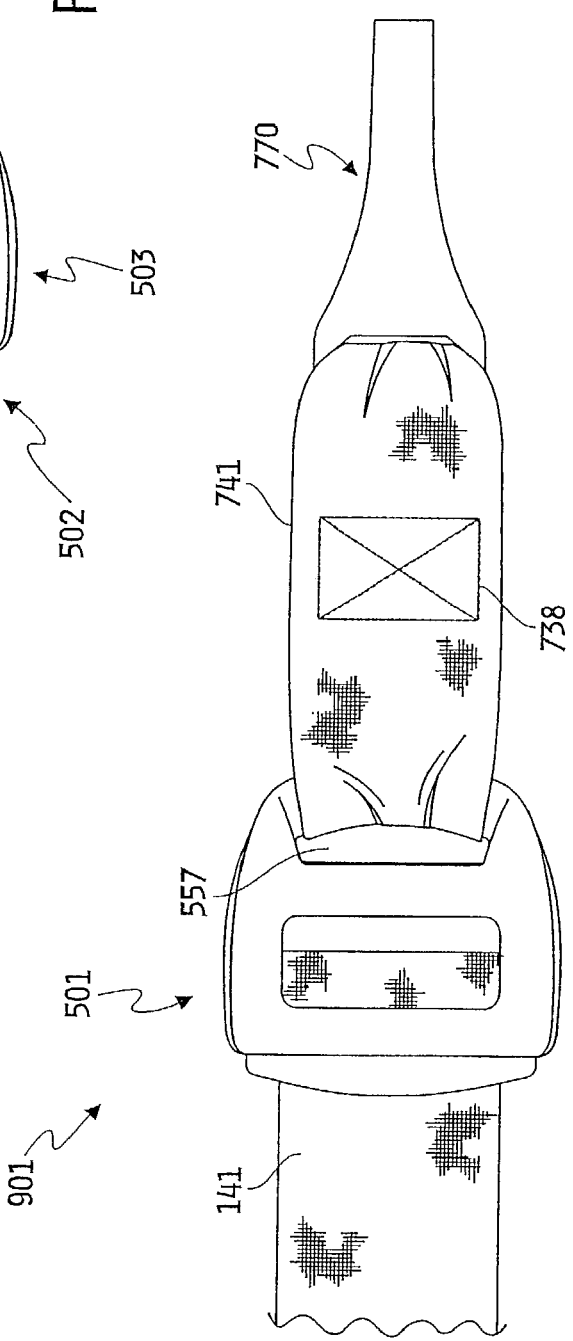
FIG. 59 is a top view of an illustrative embodiment of a web adjuster coupled to a snaphook by web and showing another web threaded through the adjuster.

Like previously discussed rotary coupling 27, the distal end of web 196 (FIG. 31) can be attached to the proximal end of connector 160 in any conventional manner, such as with pins, rivets, stitching 738, or a conventional web adjuster. But in this regard, it is also contemplated that both rotary coupling 27 and connector 160 may incorporate web adjuster 101 as an integral part of the connector. Similarly, coupling 360 and 460 disclosed incommonly owned U.S. patent application Ser. No. 10/206,603 of Anthony, et al. filed Jul. 26, 2002, incorporated herein by reference could incorporate adjuster 101 as an integral part of the connector. Likewise, couplings 27 and connector 160, 360, 460 could incorporate as an integral part, or using a web connection, any of the web adjusters 501, 601, 701 described below and, conversely, web adjusters 101, 501, 601, and 701 could be used with any sort of connector, whether integral thereto, or used with an intervening web, examples of both of which are shown in FIGS. 58 and 59 below. These web adjusters are generally employed in a mid-belt configuration, wherein they attach at one end to some type of connector or coupling, or directly to some other devise, such as a seat, as noted, and then they operatively receive a length of web at the other end and thereafter allow a user to size and maintain the length of the web as desired by paying web in or out of the adjuster in a conventional manner. The method to attach web adjusters 101, 501, 601, 701, 801 to either coupling 27 or connector 160, is well within the average skill of this art. Be that as it may, FIGS. 29-36 illustratively depict such an integration and the following description is provided for the convenience of the reader.

Figure 36:
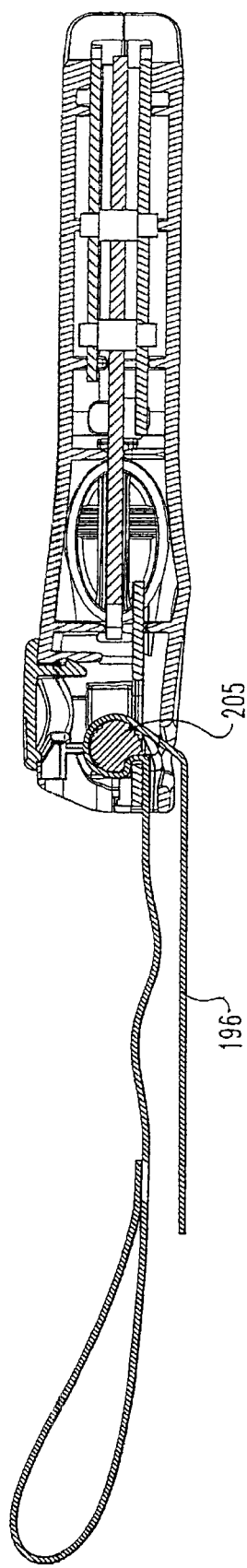
FIG. 36 is a top cross-sectional view of a connector according to one embodiment of the present invention.
Figure 37:
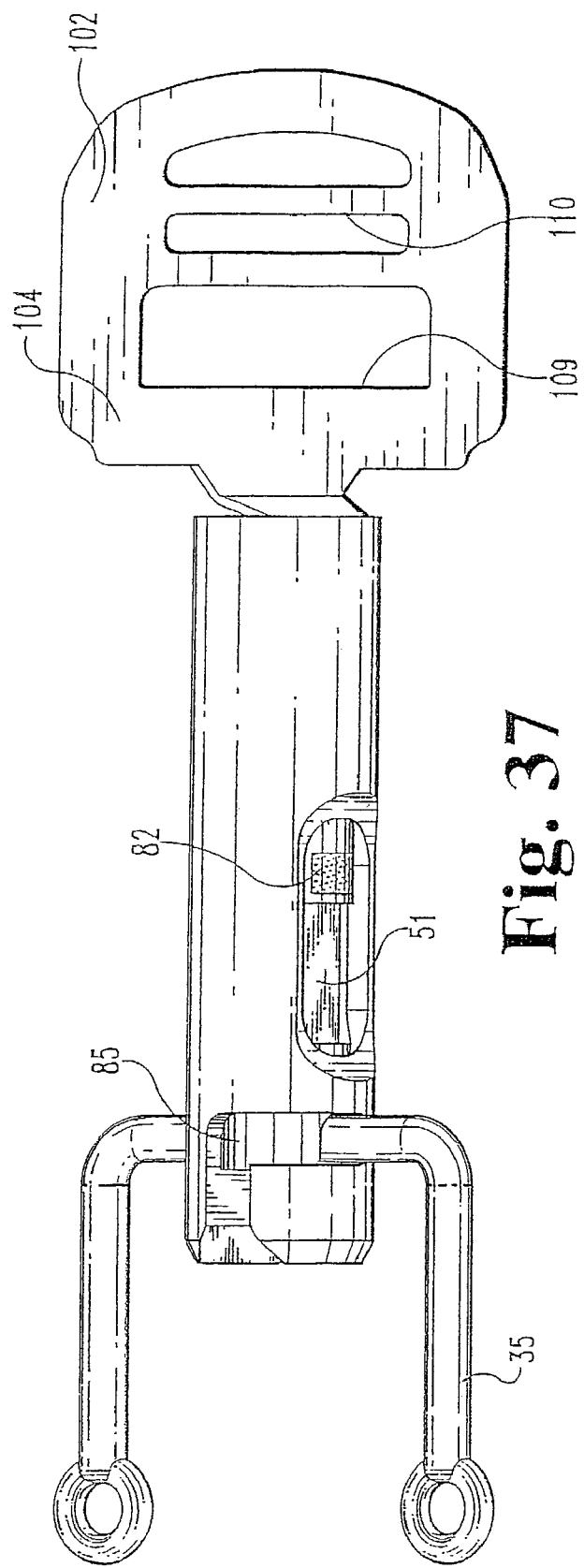
FIG. 37 is a top view of a rotary coupling incorporating a web adjuster according to one embodiment of the present invention.

Referring again to FIGS. 33-35, there is shown an exploded view of web adjuster 201 that is integrated or attached to connector 160. Like web adjuster 101, web adjuster 201 includes a bar 205, two springs 206 & 207 (FIG. 35), a button 208, a frame 202; which may be conceptually subdivided into housing 203 and plate 204; and a web 196 (FIG. 36). Bar 205, and springs 206 & 207 are preferably identical to the previously described bar 105 and springs 106 & 107, and web 196 is wound around bar 205 similarly as web 141 is wound around bar 105. Housing 203 is largely identical to previously described housing 103 except that it is now an integral part or a continuation of housing 161 and includes a cover 197 to cover access opening 144. Finally, plate 204 is largely similar to previously described plate 104 with a web stop 209 to grip web 196 just as web stop 109 gripped web 141. But by also being a continuous part of plate 164, plate 204/plate 164 provides a mechanical connection between a fixedly mountable rigid member (not shown) and web 196. Connector 160 or the rotary coupling of FIG. 37 may be integrally connected to a web adjuster such as web adjuster 101.

Figure 38:
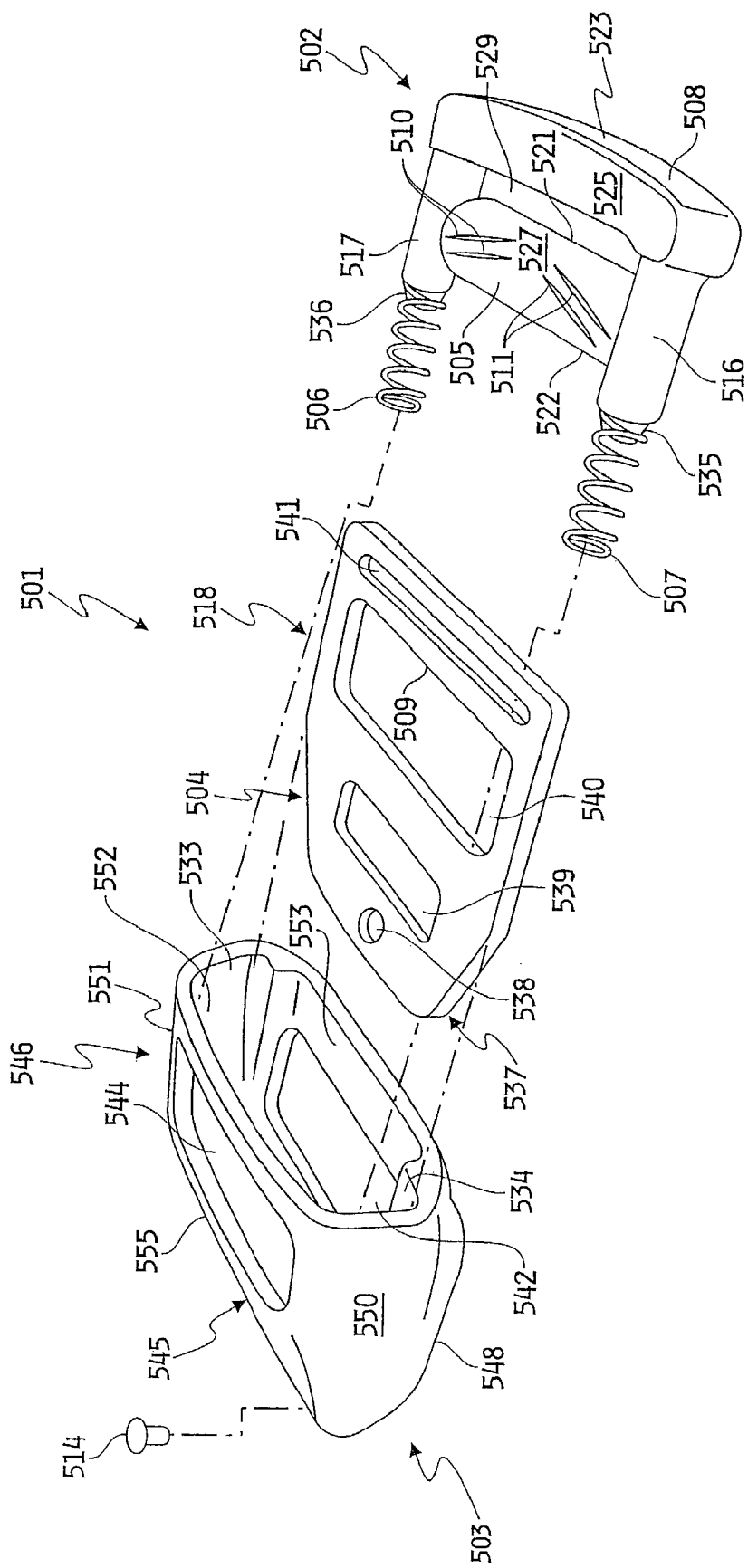
FIG. 38 is an exploded view of an adjuster showing the unitary release and bar according to one embodiment of the present invention.
Figure 54:
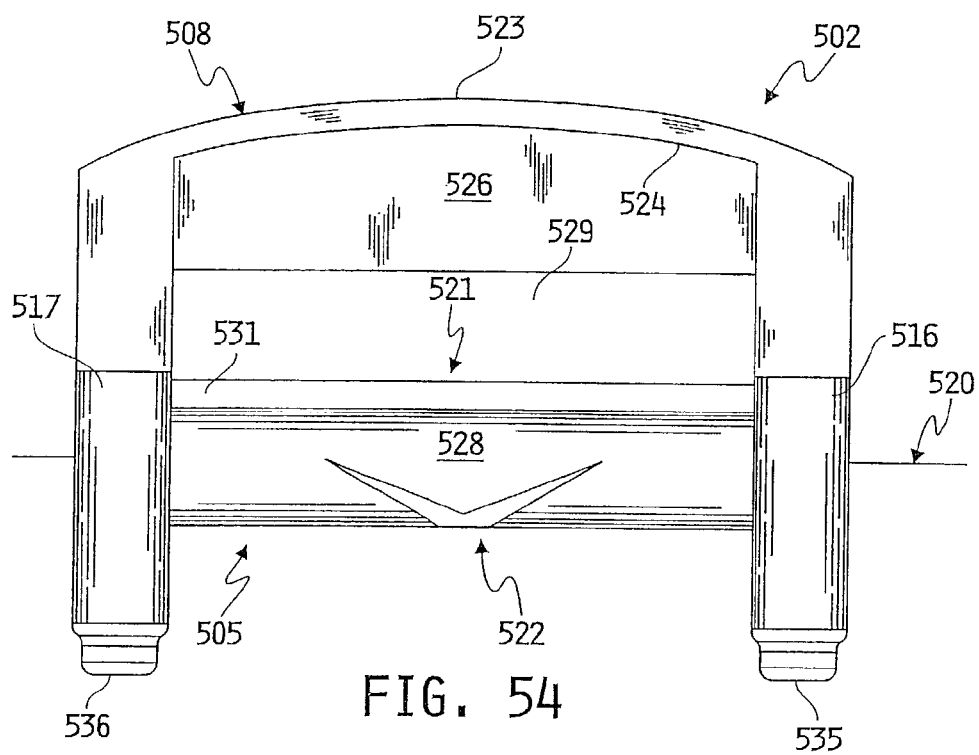
FIG. 54 is a top view of a gripping assembly according to one embodiment of the invention.

Referring to FIGS. 38-44 and 54-56, another illustrative web adjuster 501 is depicted. The web adjuster 501 comprises a gripping assembly 502, a housing or frame 503, a plate 504 and first and second biasing members or springs 506 and 507. As best seen in FIGS. 38 and 54, gripping assembly 502 comprises a gripping portion or bar 505, a manipulation portion or button 508, and a pair of spaced apart ears 535, 536. Gripping assembly is illustratively of monolithic construction and may be made for example from injection molded plastic or die cast from zinc. Gripping assembly illustratively has a generally rectangular profile and includes generally at its core the longitudinally extending gripping portion 505 which has a generally elliptical to rectangular cross section having a longitudinal axis 520, a front face or gripping surface 521, a back face 522, a top face 527, and a bottom face 528.

Figure 40:
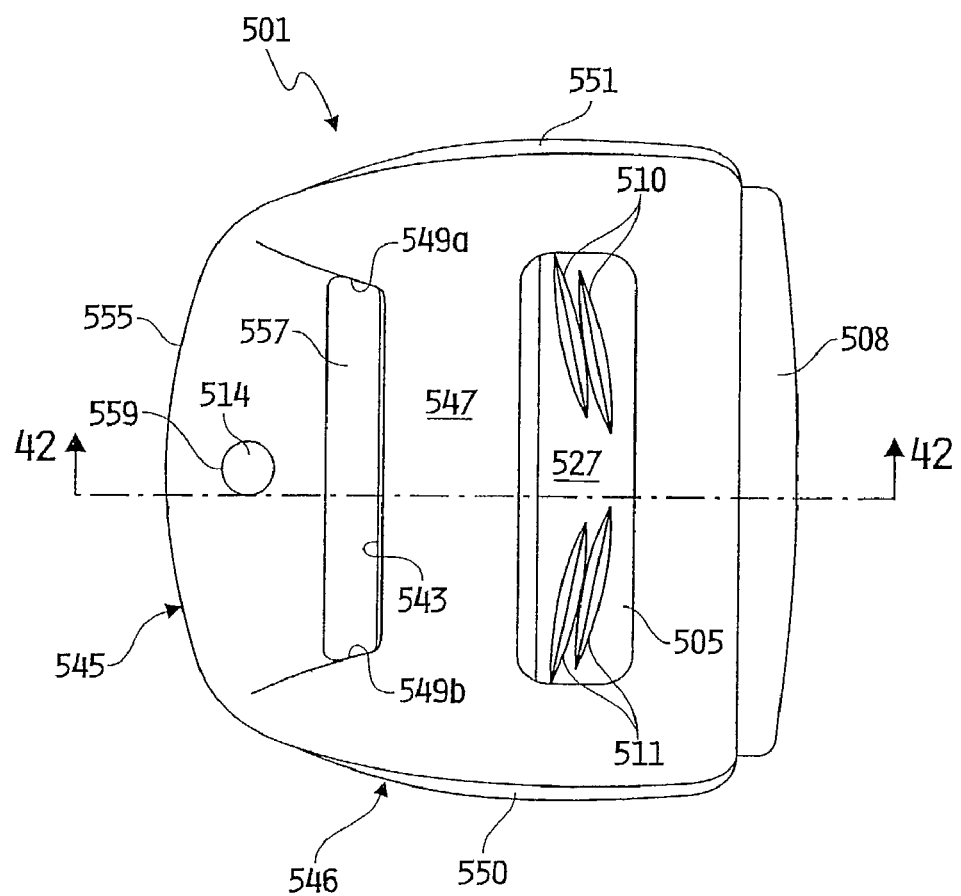
FIG. 40 is a top view of an adjuster showing the gripping pattern according to one embodiment of the present invention.
Figure 41:
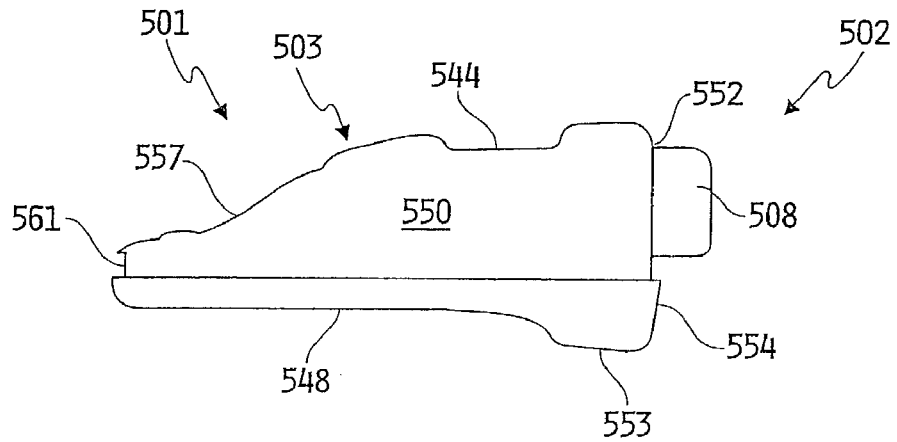
FIG. 41 is a side view of an adjuster according to one embodiment of the present invention.
Figure 55:
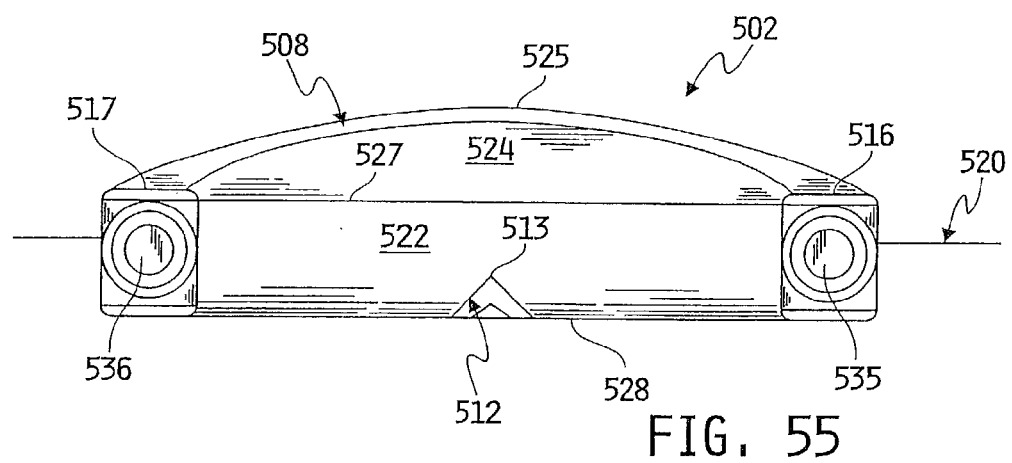
FIG. 55 is an end view of a gripping assembly according to one embodiment of the invention.

As with bar 105, bar 505 may have alternative cross-sections known to those skilled in the art. For example, it may have any one of a generally, cylindrical, ovate, or rectangular shape. Referring to FIGS. 38 and 40, top face 527 includes a first pair of generally parallel protrusions or ridges 510 and a second pair of generally parallel ridges 511. The first pair of ridges 510 extends generally obliquely and longitudinally away from ear 517 and back face 522 toward front face 521 and generally toward the center of bar 505. Similarly, the second pair of ridges 511 extends generally obliquely and longitudinally away from ear 516 and back face 522 toward front face 521 and generally toward the center of bar 505. Therefore, first and second pair of ridges 510 and 511 angle toward each other as they extend generally toward the center of front face 521. Referring to FIG. 54, bottom face 528 illustratively includes a longitudinal notch 531 adjacent to front face 521. Notch 531 is substantially similar to notch 131 depicted in FIG. 28 and includes bevel 532 to assist bar 505 in seating against a web, such as 141, and the web stop 509. Illustratively, web 141 is held between point 532a on bevel 532 and the top edge of web stop 509 on plate 504. Referring to FIGS. 54 and 55, bottom face 528 and back face 522 illustratively include portions of a generally V-shaped protrusion or ridge 512 having a vertex 513 oriented towards and positioned on back face 522 with opposite sides of V-shaped ridge 512 extending obliquely and laterally away from the vertex 513 in opposing fashion toward notch 531.

The protrusions 510, 511, 512 facilitate the gripping of a web by the gripping portion 505 and further cooperate with notch 531 and stop 509 to grip a web, as for example, web 141 depicted in FIGS. 20-22, and allow the gripping to take place in almost any linear orientation. One skilled in the art will appreciate that a fewer or greater number of ridges on the top or bottom faces, or even on the front or back face, fall within the scope of the invention. Similarly, alternative patterns and locations of ridges or protrusions may be used. For example, the a W-shaped ridge, an S-shaped ridge, a zigzag patterned ridge, a series of three or more parallel ridges, and the like could be used. Such ridges could be at the periphery of the bar, in the center of the bar, or span the length of the bar, for example.

Figure 42:
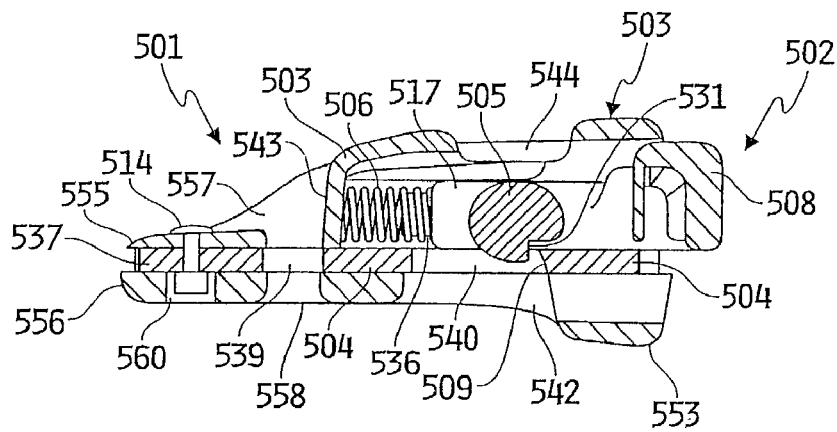
FIG. 42 is a partial side sectional view of an adjuster with the release button in the relaxed position according to one embodiment of the present invention.
Figure 43:
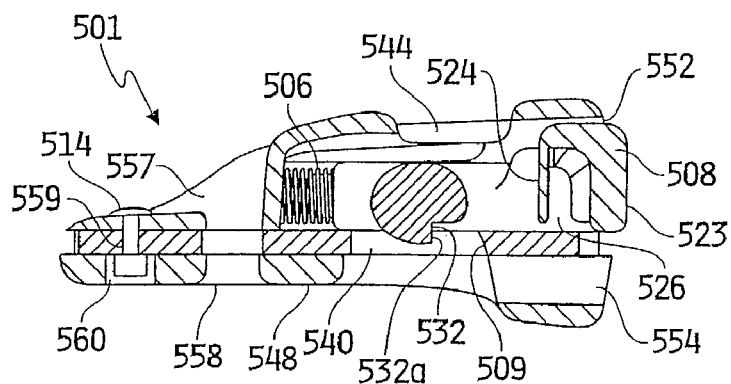
FIG. 43 is a partial side sectional view of an adjuster with the release button in the depressed position according to one embodiment of the present invention.
Figure 44:
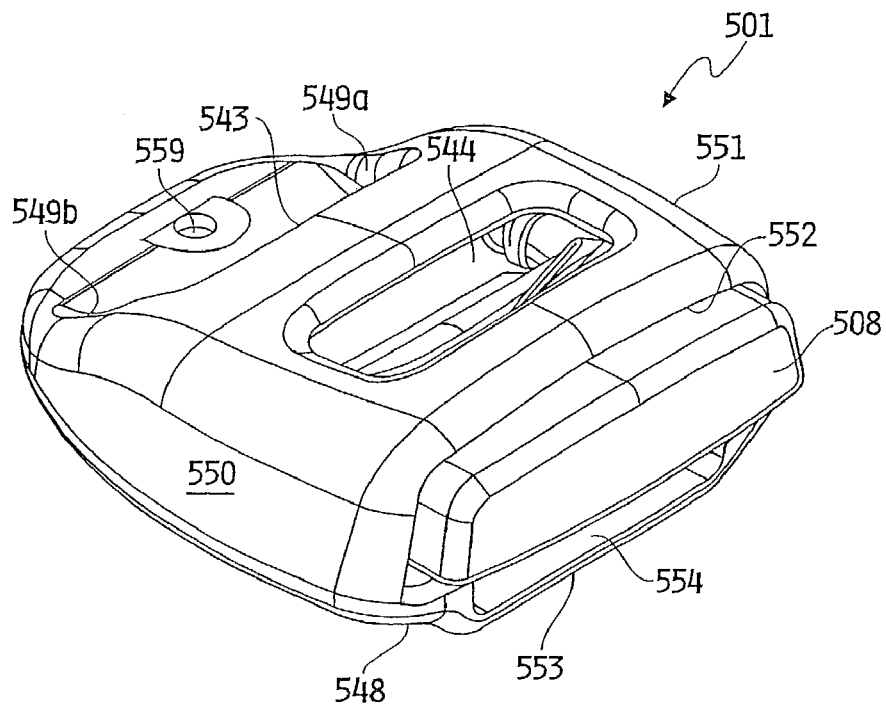
FIG. 44 is a perspective view of one embodiment of the present invention.
Figure 45:
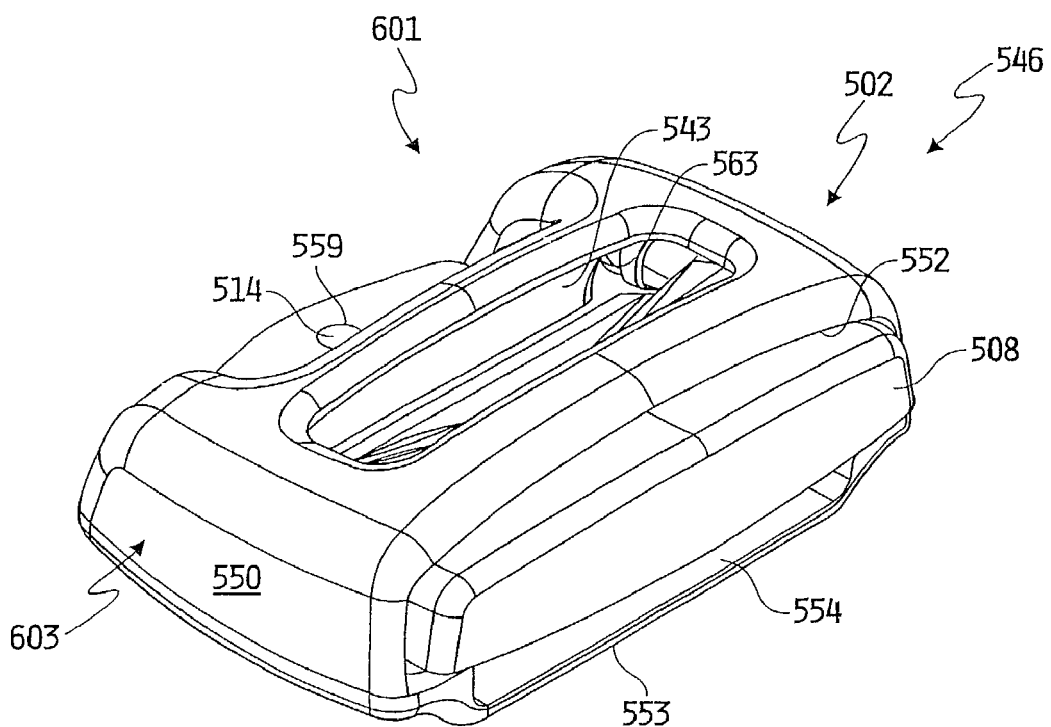
FIG. 45 is a perspective view of another embodiment of the present invention with a reduced profile.
Figure 50:
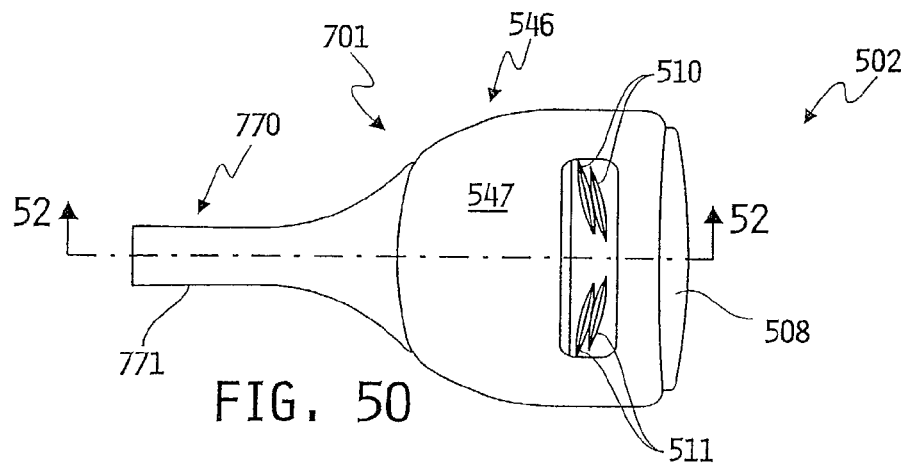
FIG. 50 is a top view of a combination snap hook and web adjuster showing the gripping pattern according to one embodiment of the present invention.
Figure 51:
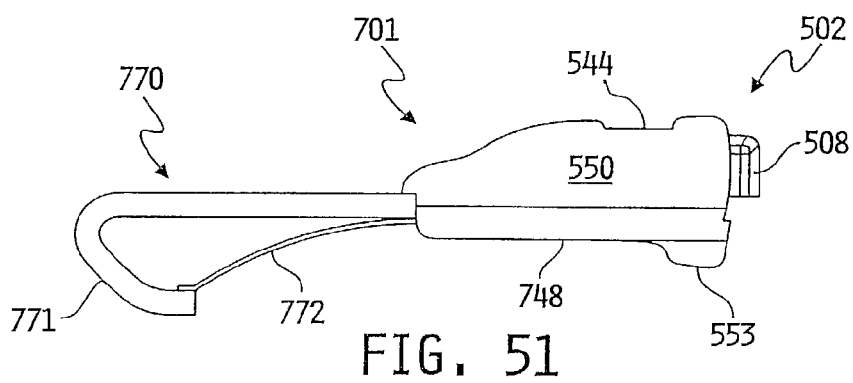
FIG. 51 is a side view of a combination snap hook and web adjuster according to one embodiment of the present invention.

The manipulation portion or button 508 is generally parallel to bar 505 and is spaced apart therefrom. Button 508 illustratively is generally rectangular in cross section and has a curvate front face 523, a back face 524, a curvate top face 525, and a bottom face 526. It will be appreciated that front and top faces 523, 525 need not be curvate. Bottom face 526 may be of solid construction as shown in FIG. 54, or may be hollowed out as shown in FIGS. 42 and 43. Parallel and elongated ears 516 and 517 are perpendicular to button 508 and extend away therefrom, toward and beyond gripping bar 505 ending respectively at spring mounting tabs 535 and 536. The gripping bar 505 is generally parallel to button 508 and is perpendicular to, and extends transversely between the ears 516 and 517. Ears 516, 517, button 508 and bar 505 define aperture 529. Ears 516 and 517 illustratively have generally rectangular cross sections, although they may have any suitable shape, such as for example, elliptical or cylindrical. Illustratively, the mounting tabs 535, 536 have a generally cylindrical cross section and are configured to receive an end of springs 507 and 506, respectively, as best seen in FIG. 38.

As noted, the gripping assembly 508 is plastic and is of monolithic construction, formed by injection molding. It will be appreciated, however, that it may be made of any suitable metallic, non-metallic, or composite material. For example, gripping assembly 508 may be made of molded plastic, as noted, or graphite; although, other materials and methods of manufacture, such as die-cast zinc or titanium and the like, may be used. Moreover, the gripping assembly need not be of monolithic construction, but may be a unitary construction comprising discrete button, bar, and ear components coupled together similar to the corresponding components of web adjuster 101.

Referring to FIG. 38, plate 504 illustratively is of generally monolithic construction and of generally metallic composition, as, for example, stamped or die-cast steel, zinc or the like. It will be appreciated that alternative materials and methods of manufacture, such as non-metallic materials, including injection molded plastic or graphite, or composite materials may be used as well. Plate 504 has a generally rectangular portion 518 and a generally triangular tab portion 537. Tab portion 537 includes coupling aperture 538 and anchor or mounting aperture 539. Coupling aperture 538 is configured to receive a coupler, such as for example rivet 514, as will be explained. The rectangular portion 518 includes a web gripping aperture 540. Gripping aperture 540 includes a web stop 509. Plate 504 further includes, illustratively, an indentation 541. Indentation 541 may be, for example, embossed or stamped into plate 504, and may add rigidity to the plate 504. Plate 504 is sized to fit inside housing 503. The apertures 538, 539, 540 and stop 509 will be further explained below. It will be appreciated that plate 504 could be modified or even eliminated by those skilled in the art. For example, the plate could comprise merely the web stop portion 509. Moreover, such web stop portion 509 could be integral to the frame 503, thereby eliminating the need for a separate plate 504, as for example depicted and described below with respect to adjuster 802.

Illustratively, housing 503 is injection molded from plastic and is of monolithic construction; although it will be appreciated that alternative metallic, non-metallic, or composite materials, such as, for example, zinc, aluminum, titanium, graphite, kevlar and the like may be used. Similarly, alternative methods of manufacture suitable to the chosen material, such as die-casting, extruding, stamping, and the like may be used. Housing 503 comprises a generally rectangular portion 546 (FIGS. 39, 40) and a generally triangular tab portion 545 (FIGS. 38, 40). Rectangular portion 546 includes a top surface 547 defining an aperture 544, as shown best in FIG. 38, a bottom surface 548 defining an aperture 542, as shown best in FIG. 38, opposite side surfaces 550 and 551, and front surface or backstop 543, which together define open-ended cavity 552 best seen in FIG. 56. Bottom surface 548 includes appendage 553 defining a web guide aperture 554. Tab portion 545 includes a top surface 555 defining web anchor or mounting aperture 557, and bottom surface 556 defining web anchor aperture 558. Top and bottom surfaces 555 and 556 also define respective coupling apertures 559 and 560. Top and bottom surfaces may also define plate aperture 561. Apertures 544, 540 and 542 provide access to the bar 505, and any web passing through the adjuster.

Cavity 552 also includes channels 533 and 534 formed along the periphery of the housing 503 and terminating at channel ends 563 and 564. Channel ends 563 and 564 generally proceed past the backstop 543 in the vicinity of spaced apart walls 549a and 549b. The springs 506 and 507 and their respective ears 517, 516 are disposed within the channels 533, 534, with the springs ends adjacent to the channel ends 563, 564 and the mounting tabs 536 and 535. The gripping assembly translates in a generally linear manner as the ears move in the channels 533, 534 and the springs 506, 507 compress and decompress.

Figure 39:
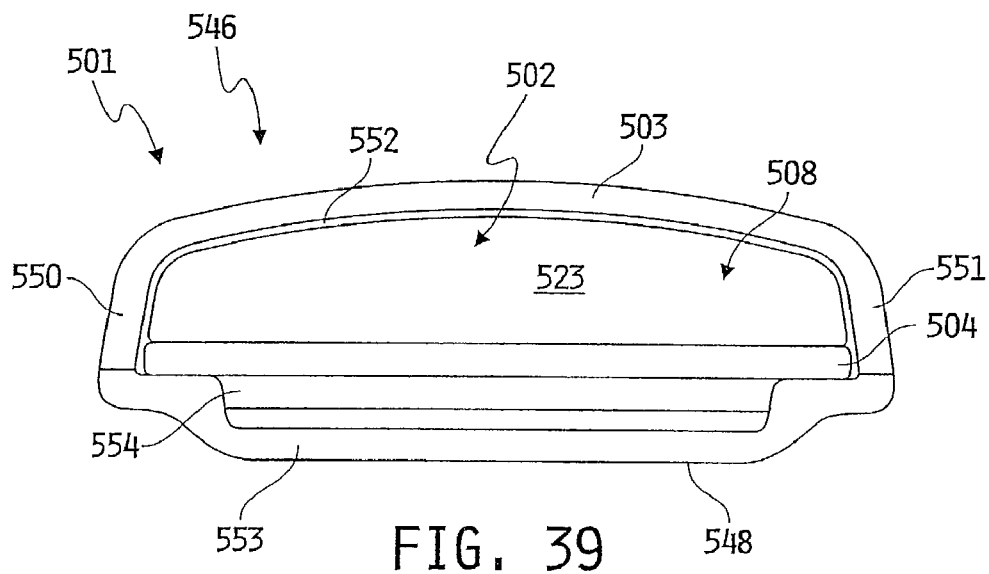
FIG. 39 is an end view of an adjuster according to one embodiment of the present invention.
Figure 56:
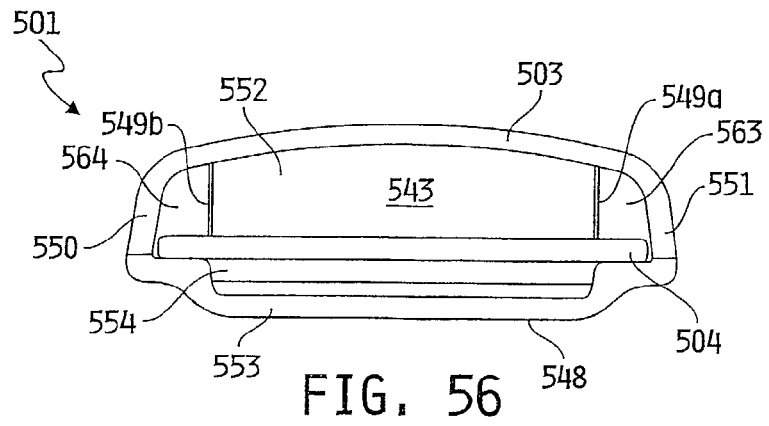
FIG. 56 is a partial end view of an illustrative web adjuster housing assembly and plate according to one embodiment of the invention.

Cavity 552 is configured to receive plate 504 as seen in FIGS. 38 and 56 as follows. Plate 504 rests on bottom surface 548 and nestles under front surface 543 and generally within plate aperture 561. It will be appreciated, however, that the plate 504 could nestle between top and bottom surfaces 555, 556 without the need of aperture 561. When plate 504 is received within cavity 552, the coupling apertures 538, 559 and 560, the anchor apertures 539, 557, and 558, and the access apertures 540, 544 and 542 are in respective alignment with each other. Rivet 514 is received in sequence through coupling apertures 559, 538 and 560 to couple together the plate 504 and the housing 503. It will be appreciated that other couplers, such as a press fit, a screw, a nail, a weld and the like, may be used. It will also be appreciated that more than one coupler, for example two rivets and corresponding coupling apertures, may be used. Cavity 552 is further configured to receive gripping assembly 502, which lies on top of plate 504 as shown in FIGS. 38 and 39.

Illustratively, the web adjuster 501 is initially assembled by mounting the springs 506, 507 to their respective mounting tabs 536, 535; placing the gripping assembly 502 on top of the plate 504, and sliding the assembly 502 and plate 504 into housing 503. Coupler 514 secures the components inside housing 503 by passing through apertures 559, 538, 560.

Figure 52:
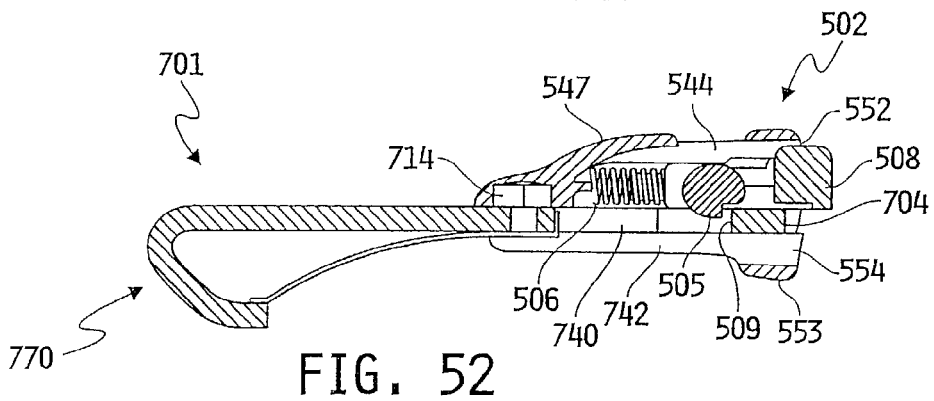
FIG. 52 is a partial side sectional view of a combination snap-hook and adjuster with the release button in the depressed position according to one embodiment of the present invention.
Figure 53:
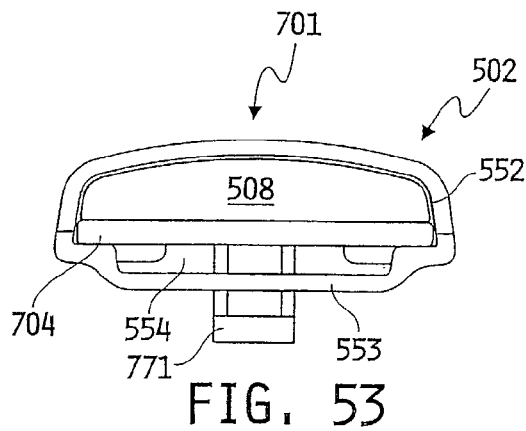
FIG. 53 is an end view of a combination snap hook and web adjuster according to one embodiment of the present invention.

The gripping assembly 502 moves within the channels 533, 534 of cavity 552 as described with springs 506 and 507 biasing the assembly 502 in its normal position such that notch 531 abuts web stop 509. Substantially as shown in FIG. 22, with the exception that bar 505 differs from bar 105, a web 141 is threaded through aperture 545, around bar 505, back through aperture 545 and out through aperture 554 as is known by those skilled in the art. In the normal position, then, bar 505 is urged against stop 509, thereby gripping web 141 therebetween as shown in FIGS. 42 and 52. Adjuster 505 is operated by apply pressure to button 508, as by pressing, which compresses springs 506 and 507 and releases the grip of bar 505, as shown in FIGS. 43 and 48. With the grip released, end 150 of web 141 in FIGS. 22, 58 and 59 can be extended by pulling end 150 away from adjuster 501. End 151 can be extended whether button 508 is pushed or not by pulling end 151 away from adjuster 501.

Anchor apertures 539, 557, 558 are configured to receive web belts coupled as by stitching 738, snaps, or hook and piles and the like. Apertures 539, 557, 558 may also receive a belt attached to a snap hook, a mini-connector, as disclosed in the aforementioned provisional application No. 60/307,899, or other conventional connectors for attachment to some type of anchor member. Such connectors or anchor members may be integrated directly into the adjuster 501 at the location of the apertures 539, 557, 558 as well. It will be appreciated, therefore, that adjuster 501 is not only configured to be a mid-belt adjuster, but may also be used as an adjuster connected directly to, or integrated with a coupling device, a connector or an anchor member, the method of connecting or integrating falling well within the scope of one skilled in this art as seen in, for example, FIGS. 49 and 58-59.

The illustrative embodiments depicted in FIGS. 45 through 53, and 57 through 59 are structurally similar and functionally identical to the illustrative embodiments described and depicted in FIGS. 38-44 and 54-56. Accordingly, like reference numerals are used for like features and similar numerals, increased by 100 for each subsequent embodiment, 601, 701, 801 are used for similar features and the foregoing description of the function of such features is equally applicable for these features and reference should be made to said foregoing description. Similarly, as already noted with adjuster 501, each of the components of each of these illustrative embodiments may be of any suitable metallic, nonmetallic, or composite material, or combination thereof, and fashioned in any method suitable to such chosen material, such as, for example, injection molded plastic, or die cast zinc. Illustratively, then, the entire web adjuster 501, 601, 701, 801 may be injection molded from plastic, or, alternatively, for example, the housing 503, 603, 703, may be of injection molded plastic, the gripping assembly 502, 602, 702 may be of die-cast zinc, and the plate 503, 603, 703 may be of stamped or die-cast steel.

Illustrative web adjuster 601, depicted in FIGS. 45-48 is functionally identical to adjuster 501, and is substantially similar structurally with slight differences in profile. More specifically, web adjuster 601 has a reduced profile in that tab portion 645 is shorter than tab portion 545. Similarly, then, plate 604 has a somewhat smaller tab portion 637 and anchor aperture 657. Illustratively, plate tab portion 637 overlays housing tab portion 645 rather than being disposed between the housing tab portion 645, which also has a smaller anchor aperture 658. Of course, tab portion 637 could also lie underneath housing tab portion 645, as in adjuster 101 (FIGS. 22 and 23), or, as in adjuster 501 (FIG. 42), tab portion 637 could be sandwiched inside the tab portion 645. Indeed, any of these configurations are adaptable by one skilled in the art to any of the illustrative embodiments 101, 201, 501, 601, 701, 801 described herein.

Figure 57:
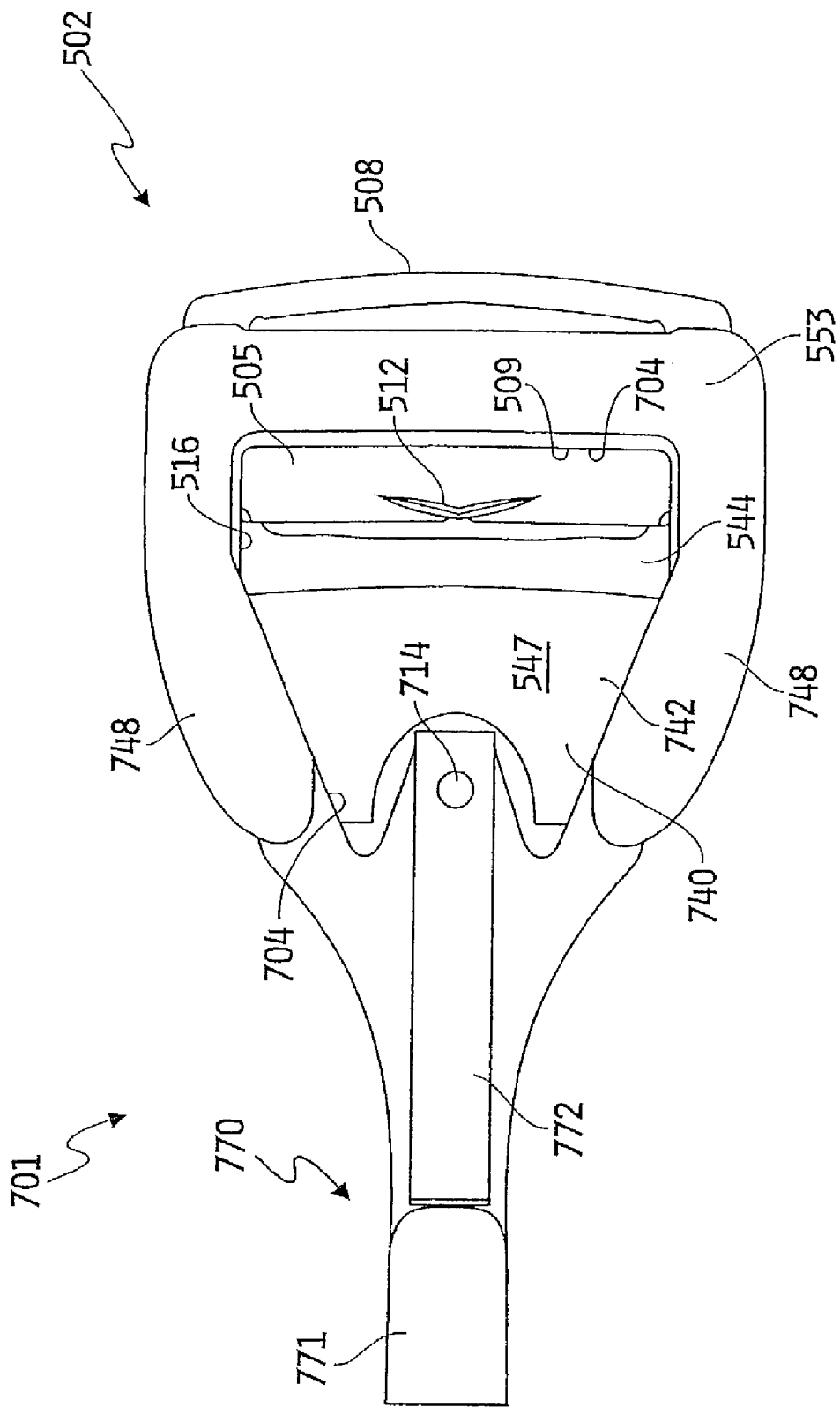
FIG. 57 is a bottom view of the illustrative embodiment of FIG. 50.

Illustrative web adjuster 701, depicted in FIGS. 49-53 and 57, is functionally identical to adjuster 501, and is substantially similar structurally. Web adjuster 701 includes gripping assembly 502, housing 703, springs 506 and 507 and connector 770. Gripping assembly 502 and springs 506 and 507 are made and function substantially as described above in all respects, including, as noted, alternative materials, manufacture and size. Referring to FIGS. 52 and 57, housing 703 is generally concave in shape, with its bottom surface 748 defining a bottom opening or aperture 742, which is generally coextensive with aperture 740 defined by frame 704. Illustratively, then, the web stop 509, would be carried directly on the frame 704 as would be apparent to those skilled in the art, not only with respect to this embodiment, but to the other illustrative web adjusters 501, 601, 801 just as is the case with adjuster 101. It will be appreciated, too, that bottom surface 748 and frame 704 could also be generally closed as in bottom surface 548 and plate 504.

Adjuster 701 includes a connector or snap hook portion 770 having a hook portion 771 and a spring or keeper 772 attached by coupling 714, which may, for example, be a rivet, a screw, a bolt, or other conventional coupling. Hook portion 771 and keeper 772 are configured to cooperatively and releasably engage an anchor member, such as a round bar or D-ring, in a conventional manner well known to those skilled in the art. For example, such a web adjuster 701 might be used in conjunction with a child seat to attach an upper tether to a car mounting member.

The connector portion 770 illustratively has a frame 704 integrated into the housing 703. Alternatively, the connector 770 could be coupled to housing 703 using anchor apertures 539, 557, 558 as has been described and as is depicted in FIGS. 58 and 59. Referring to FIG. 58, the connector 770 of adjuster 801 is attached to the anchor apertures 539, 557, 558 using coupling 714, which may be any suitable conventional coupling such as a bolt, or screw, or rivet, and the like. In addition, a plurality of couplings 714 could be used. Referring to FIG. 59, the connector 770 of web adjuster 901 is attached to the anchor apertures 539, 557, 558 using a length of web 741, which is threaded through the anchor apertures 539, 557, 558 in a conventional manner, then wrapped back upon itself and through the mounting aperture on connector 770 and secured, illustratively, by stitching 738, although the web 741 could be secured using other suitable methods such as heat press, glue, hook and pile, snaps, tape and the like.

Illustrative web adjuster device 802, depicted in FIGS. 60-65, generally comprises a housing or body 803 which comprises a web adjuster portion 501 and a connector portion 870. Web adjuster portion 501 comprises gripping assembly 502 and biasing members or springs 506 and 507 received within channels defined by the housing 803 as described above. Web adjuster 802 is functionally and structurally similar to adjuster 701. Gripping assembly 502 and springs 506 and 507 are made and function substantially as described above in conjunction with web adjuster 501 in most respects, including, as noted, alternative materials, manufacture and sizes, the major difference being the absence of a reinforcing plate 504. It will be recognized, however, that such a plate 504, or in the alternative, 704, fall within the scope of the invention. It should further be recognized that the use of any conventional web adjuster also falls within the scope of the invention.

Housing 803 has a generally pear shape and is illustratively of monolithic construction extending from the web adjuster portion 501 to the connector portion 870. It may be manufactured out of injection molded plastic, or other suitable metallic, non-metallic or composite materials as described herein. Housing 803 comprises a top surface 547 defining therethrough aperture 544 and a bottom surface 748 defining a bottom opening or aperture 742, which in turn defines a web stop portion 809 as was mentioned could be the case with web adjusters 501, 601, 701, 801. It will be appreciated that bottom surface 748, which is spaced apart from top surface 547, could also be generally closed as in bottom surface 548 described above, and/or that spaced-apart top surface 547 may be generally closed, thereby eliminating aperture 742 and/or aperture 544. The web adjuster portion 501 is configured to receive and vary or adjust the operable length of a flexible member 141 such as for example, a rope, a strap, or a web. Web 141 is slidingly received through aperture 554, between housing portion 804 and housing appendage 553, wrapping partially around gripping portion 505, and proceeding between gripping portion or bar 505 and stop portion 809. The operation of the web adjuster portion 501 is substantially the same as described above, such that applying a force in the direction of arrow 172 (FIG. 63) allows the slack in web 141 to be taken up, thereby decreasing the operative length of web 141. Applying a force in the direction of arrow 174, urges the gripping portion 505 against the stop portion 809 thereby trapping the web 141 therebetween. Pressing on manipulation portion 508 separates the gripping portion or bar 505 from the stop portion 809 allowing the web 141 to be paid out in the direction of arrow 174. As noted, any conventional adjuster may be used, however.

Figure 60:
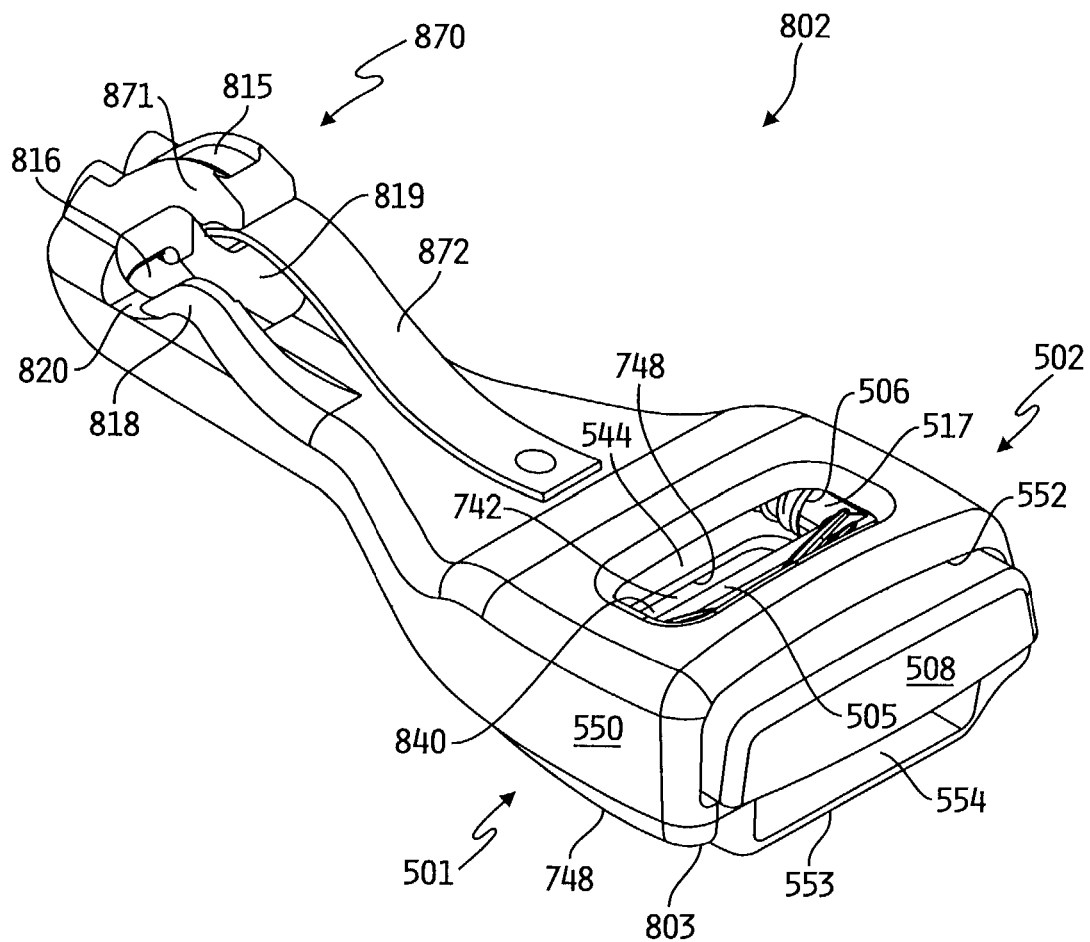
FIG. 60 is a perspective view of another illustrative combination snap hook and web adjuster.
Figure 61:
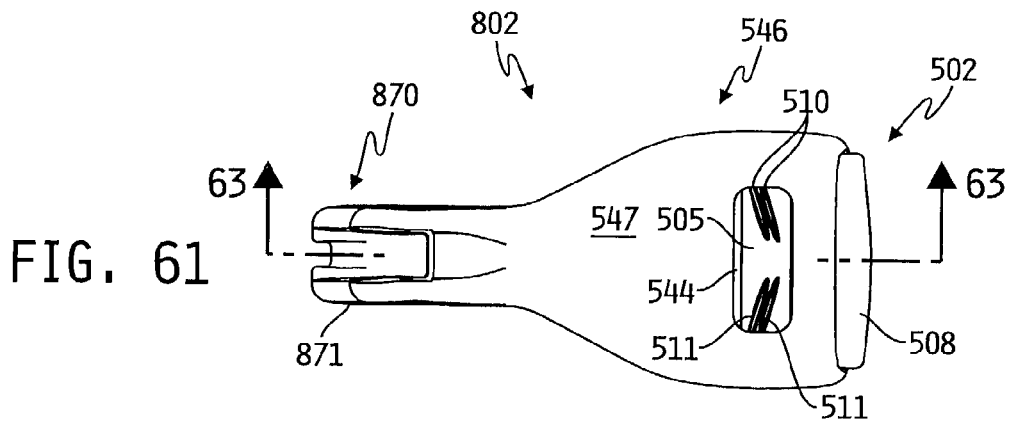
FIG. 61 is a top view of another illustrative combination snap hook and web adjuster.
Figure 62:
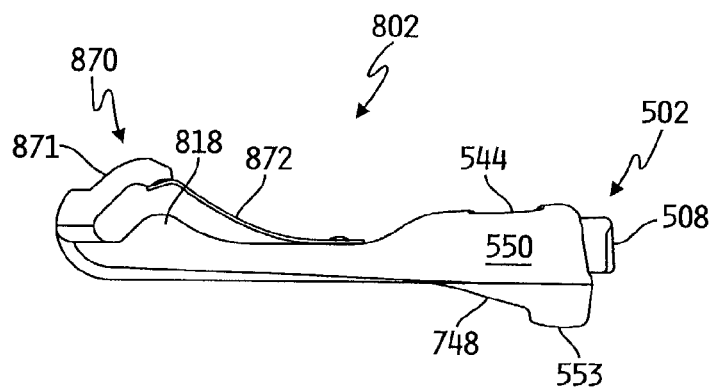
FIG. 62 is a side view of another illustrative combination snap hook and web adjuster.

The connector or snap hook portion 870 illustratively comprises a hook portion 871 and a spring or keeper 872 as depicted in FIGS. 60 and 62. Keeper 872 may be attached to housing 803 by any conventional matter such as, for example, by a rivet, a screw, a bolt, or other conventional coupling. However, referring to FIGS. 61, 63, and 64, it can be seen that the snap hook portion 870 need not have a keeper 872 at all. The hook portion 871 curves generally upwardly away from bottom surface 748 of the web adjuster portion 501. In contrast, hook portion 771 of adjuster 701 curves generally downwardly away from bottom surface 748.

Figure 63:
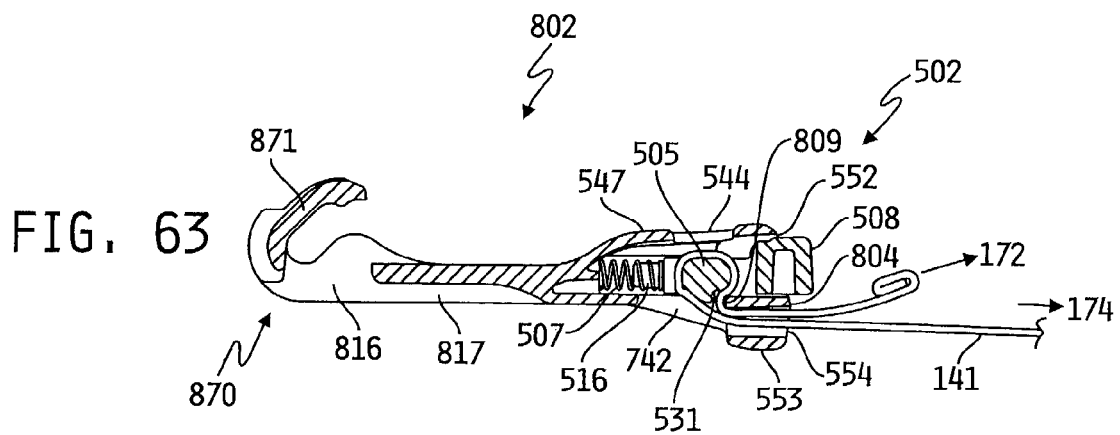
FIG. 63 is a partial side sectional view of another illustrative combination snap hook and web adjuster showing a web threaded through the adjuster.
Figure 64:
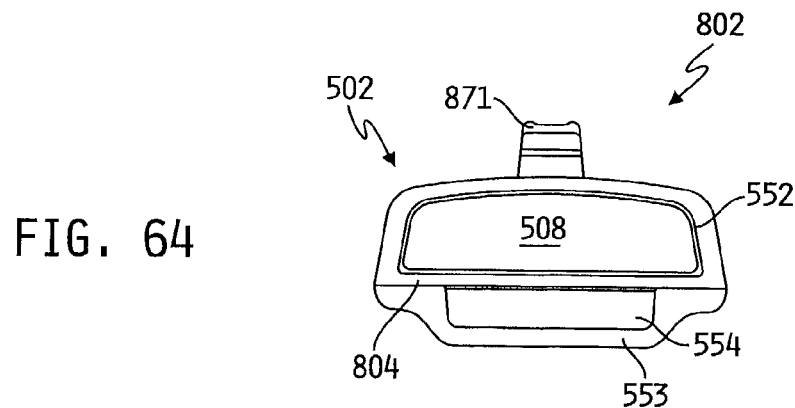
FIG. 64 is an end view of another illustrative combination snap hook and web adjuster.

Referring to FIGS. 60 and 63, hook portion 871 comprises a channel 815 formed into the top rounded portion of the hook, the channel 815 ending in an aperture 816 defined in the bottom surface 748 of the hook portion. On the other side of the aperture or cut-out 816, a second channel 817 is formed in the bottom surface 748. It will be appreciated that the channels 815 and 817 help provide rigidity to the hook portion 871, and in conjunction with the cut-out 816, help reduce the overall weight of the adjuster device 802. The hook portion also comprises a pair of spaced apart rounded sides or rises 818, 819 projecting upwardly away from and sandwiching therebetween the cut-out 816. Hook portion 871 alone or in cooperation with keeper 872 is/are configured to releasably engage an anchor member, such as for example a round bar or D-ring 35, in a conventional manner well known to those skilled in the art. The rounded rises 818, 819 define a seat 820 between the rises 818, 819 and the inner curve of the hook portion and help to nestle the anchor member 35 adjacent to the seat 820 and thereby resist inadvertent disengagement of the anchor member 35 and the hook portion 871. This allows the keeper 872 to be eliminated as noted above.

Figure 65:
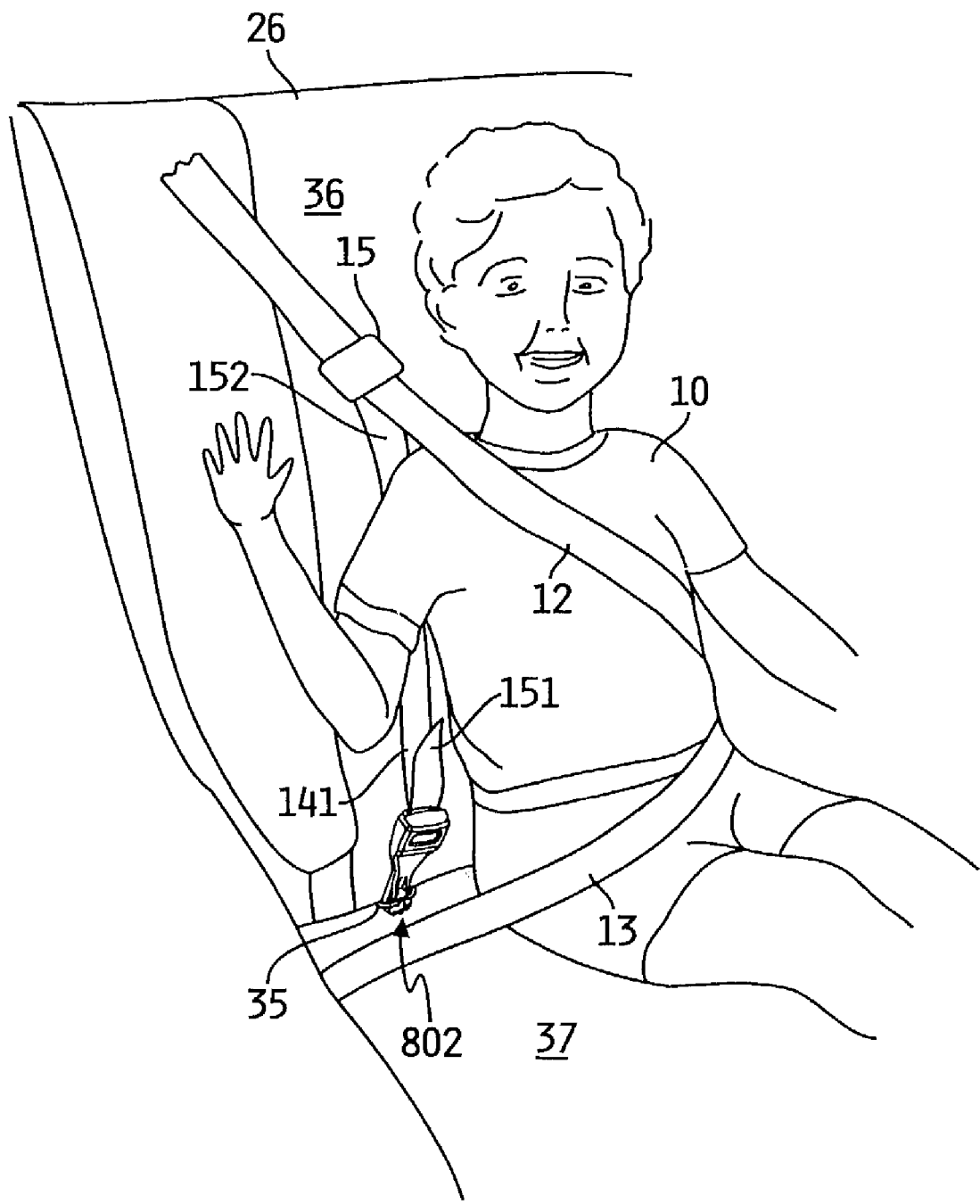
FIG. 65 depicts the illustrative embodiments of FIGS. 60-64 in an operational configuration.

For example, as shown in FIG. 65, such a web adjuster 802 might be used to connect a web 141 to a lower anchor member 35 in a car as will now be described. Illustratively, the web 141 comprises opposing ends 151, 152. First opposing end 151 is slideably received about gripping portion or bar 505 and second opposing end 152 is illustratively connected to, for example, a clamp member 15 or other coupling device, which may be configured to couple the web 141 with the shoulder, chest or torso portion 12 of a conventional seat belt system, which may further comprise a lap portion 13. The web adjuster is conventionally engaged with the anchor member 35 by inserting the hook portion 871 therethrough with the hook portion's opening facing downwardly toward the automobile's seat portion 37. By pulling on opposing end 151, in the direction of arrow 172, the operable length of web 141 is shortened and the tension increased thereby pulling shoulder/chest/torso portion 12 downwardly away from the neck of an occupant, such as a child 10, about which the shoulder belt 12 extends. Therefore, the bottom surface 748 is adjacent to the seat back 36 of the automobile seat 26. Because the hook portion 871 opens upwardly relative to the bottom surface 748, the adjuster assembly 502 and first opposing end 151 are left accessible for adjusting the operable length and thereby the tension of web 141. Another example can be seen in using the adjuster 802 to secure cargo in a vehicle. In such an example, the opposite end 152 may be connected to another web adjuster 802, or other suitable connector, and the web 141 passed about the cargo with each end 151, 152 secured to anchor members attached to the vehicle. Such cargo could be boxes, parcels, luggage, athletic equipment, tires, and the like.

In contrast to the above examples, if adjuster 802 were used to attach a child seat, for example as shown in FIG. 1A, to the anchor member 35, then the top surface would be adjacent to the automobile seat portion 37, making the adjuster assembly generally inaccessible when the slack is taken out of web 141. Conversely, the downwardly opening hook portion 771 of adjuster 701 would leave the adjuster portion accessible when used to attach a child seat (FIG. 1A) to the anchor member 35, and inaccessible when used to attach, for example, a clamp 15 (FIG. 65) to shoulder belt 12, or to any other anchor point that places bottom portion 748 adjacent to seat back portion 36.

It is within the teaching of the invention that the connector portion 870, rather than being integral to the monolithic housing 803, could be coupled to housing 803, as for example by a rivet 714 or by coupling using anchor apertures 539, 557, 558 as has been described above and depicted in FIGS. 58 and 59. Those skilled in the art will know that other forms of connectors and couplings could similarly be attached to each of the web adjusters 101, 501, 601, 701, 801, 901 using the anchor apertures 539, 557, 558, as just described, or through direct integration as described with respect to adjusters 201, 701 and 802.

It will be appreciated that each of the web adjusters described herein are configurable for use with different size belts, for example one inch (25 mm) or one-and-a-half inch (38 mm) belts depending on the desired use of the adjuster. For example, a 25 mm adjuster might be desirable for use in infant or backpack situations, whereas a 38 mm adjuster might be desirable for use in child or marine tie-down situations. Those skilled in the art will recognize how to change the dimensions of the devices 101, 501, 601, 701, 801 accordingly. Those skilled in the art will also comprehend, as has been noted throughout, that each of components may be made from any suitable metallic, non-metallic, or composite material, alone or in combination, such as plastic, steel, zinc, aluminum, titanium, graphite, and the like, depending on the desired weight and strength characteristics, and according to any suitable manufacturing process to include die casting, pressing, molding, and the like.

While the invention has been illustrated and described in detail in the drawings and foregoing description, the same is to be considered as illustrative and not restrictive in character, it being understood that one skilled in the art will recognize, and that it is desired to protect, all aspects, changes and modifications that come within the spirit of the invention.

What is claimed is:

1. A web adjuster device comprising:
  a web adjuster portion configured to size a flexible member wherein the adjuster portion comprises spaced apart top and bottom surfaces, and
  a connector portion that curves generally upwardly away from the spaced apart bottom surface comprising a snap hook portion,
  wherein the snap hook portion is configured to releasably engage an anchor member apart from the web adjuster device while allowing accessibility to the web adjuster portion to facilitate sizing of the flexible member and the web adjuster portion and the connector portion comprise a monolithic structure.

2. The web adjuster device of claim 1 wherein the web adjuster portion further comprises:
  a bar with a longitudinal axis and a front face, said bar further including a pair of ears mounted near the opposite ends of said bar and extending transverse to the longitudinal axis of said bar;
  a web extending at least partially around said bar;
  a housing with a pair of channels with the ears of said bar slidably mounted in said channels, said housing also including a web stop extending parallel to said bar; and means for urging the front face of said bar against said web and toward said web stop.

3. The web adjuster device of claim 2, wherein the bar has a frontal plane and a serrated surface, said serrated surface comprising a plurality of longitudinal grooves that reside in planes that are substantially parallel to the frontal plane of said bar.

4. The web adjuster device of claim 3, wherein said bar further includes a longitudinal notch to confront and hold the web against said web stop.

5. The web adjuster device of claim 4, wherein said bar further includes a longitudinal notch and the notch is beveled to confront and hold the web against said web stop.

6. The web adjuster device of claim 5, wherein said urging means includes a helical spring positioned in each channel of said housing, and acting between the housing and the ear received in the channel.

7. The web adjuster device of claim 6, further including a manipulation portion operatively attached to said bar, whereby operation of said manipulation portion moves said bar away from its normal position to allow said web to move around said bar.

8. The web adjuster device of claim 7, wherein the cross-section of said bar is substantially elliptical.

9. The web adjuster device of claim 7, wherein the cross-section of said bar is substantially round.

10. The web adjuster device of claim 7, wherein the cross-section of said bar is substantially rectangular.

11. The web adjuster device of claim 2, wherein the bar further comprises one or more protrusions configured to facilitate gripping of the web.

12. The web adjuster device of claim 11, wherein said one or more protrusions comprises a substantially V-shaped protrusion.

13. The web adjuster device of claim 12, wherein said one or more protrusions comprises a plurality of substantially parallel protrusions.

14. The web adjuster device of claim 2, wherein the bar further comprises a top face and a bottom face, said top and bottom faces each provided with one or more protrusions, wherein the protrusions on said bottom face are substantially V-shaped, and wherein said protrusions on said top face include a plurality of substantially parallel protrusions.

15. The web adjuster device of claim 1 wherein the connector portion further comprises a pair of spaced apart rises defining a seat configured to engage the anchor member.

16. A web adjuster device for use with a flexible member such as a web belt, the adjuster comprising:
   a housing comprising
      a connector portion, and
      a web adjuster portion,
   the connector portion configured to releasably couple to an anchor member apart from the flexible member while allowing access to the web adjuster portion, and
   the web adjuster portion comprising
      a web stop,
      a gripping assembly configured to provide a gripping portion having a longitudinal axis and a gripping surface substantially parallel to the web stop, and
      one or more biasing members acting between said housing and said gripping assembly,
      wherein said one or more biasing members urge the gripping surface toward the web stop.

\* \* \* \* \*